United States Patent
Yamazaki

(10) Patent No.: US 8,509,040 B2
(45) Date of Patent: Aug. 13, 2013

(54) OPTICAL PICKUP DEVICE AND OPTICAL DISC APPARATUS

(75) Inventor: Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/760,591

(22) Filed: Apr. 15, 2010

(65) Prior Publication Data

US 2011/0063956 A1    Mar. 17, 2011

(30) Foreign Application Priority Data

Sep. 16, 2009   (JP) .................................. 2009-214010

(51) Int. Cl.
*G11B 7/00* (2006.01)
*G11B 7/135* (2012.01)

(52) U.S. Cl.
USPC .............. 369/44.11; 369/112.03; 369/109.02; 369/110.03; 369/112.07; 369/112.12; 369/110.01; 369/110.02; 369/110.04; 369/112.16; 369/112.17; 369/112.19

(58) Field of Classification Search
USPC ................. 369/44.11, 112.03, 109.1, 109.02, 369/110.03, 112.07, 112.12, 110.01, 110.02, 369/110.04, 112.16, 112.17, 112.19
See application file for complete search history.

(56) References Cited

U.S. PATENT DOCUMENTS

| | | | | |
|---|---|---|---|---|
| 4,918,675 | A | * 4/1990 | Lee | 369/13.29 |
| 6,049,518 | A | * 4/2000 | Tsuchiya et al. | 369/112.02 |
| 6,278,548 | B1 | * 8/2001 | Shimano et al. | 359/565 |
| 2002/0009023 | A1 | * 1/2002 | Nishiwaki et al. | 369/44.23 |
| 2002/0176331 | A1 | * 11/2002 | Ariyoshi et al. | 369/44.23 |
| 2004/0004912 | A1 | * 1/2004 | Morishima | 369/44.32 |
| 2005/0013205 | A1 | * 1/2005 | Brooks et al. | 369/1 |
| 2006/0013076 | A1 | * 1/2006 | Kishimoto et al. | 369/13.01 |
| 2006/0083147 | A1 | * 4/2006 | Nagatomi et al. | 369/112.04 |
| 2007/0286053 | A1 | * 12/2007 | Izumi | 369/112.13 |
| 2008/0084806 | A1 | 4/2008 | Ito et al. | |
| 2008/0219119 | A1 | * 9/2008 | Izumi et al. | 369/53.17 |
| 2008/0285395 | A1 | * 11/2008 | Tanaka et al. | 369/44.23 |
| 2009/0154323 | A1 | 6/2009 | Matsumiya et al. | |

FOREIGN PATENT DOCUMENTS

| | | |
|---|---|---|
| JP | 4-79050 | 3/1992 |
| JP | 2000-353337 | 12/2000 |
| JP | 2004-281026 | 10/2004 |
| JP | 2006-344344 | 12/2006 |

OTHER PUBLICATIONS

Kousei Sano et al.; Novel One-beam Tracking Detection Method for Dual-Layer Blu-ray Discs, IEICE Technical Report, CPM2005-149 (Oct. 2005), Published by The Institute of Electronics, Information and Communication Engineers, email: sano.kouse@ip.panasonic.com.
Office Action issued in Japanese Patent Application No. 2009-214010 on Sep. 11, 2012.
Office Action issued in Japanese Patent Application No. 2009-214010 on Dec. 4, 2012.

* cited by examiner

*Primary Examiner* — Aneeta Yodichkas
(74) *Attorney, Agent, or Firm* — Antonelli, Terry, Stout & Kraus, LLP.

(57) ABSTRACT

An optical pickup device includes a polarization diffraction grating to diverge an optical beam reflected from an optical disc and an optical detector to receive the optical beam diverged by the polarization diffraction grating, a polarization of 0 order diffracted light diffracted through the polarization diffraction grating is substantially perpendicular to that of a +1 order diffracted light diffracted therethrough, and a polarization filter having a plurality of domains is mounted between the polarization diffraction grating and the optical detector.

18 Claims, 18 Drawing Sheets

OPTICAL PICKUP DEVICE AND OPTICAL DISC APPARATUS

INCORPORATION BY REFERENCE

The present application claims priority from Japanese application JP-A-2009-214010 filed on Sep. 16, 2009, the content of which is hereby incorporated by reference into this application.

BACKGROUND OF THE INVENTION

The present invention relates to an optical pickup device and an optical disc apparatus.

JP-A-2006-344344, page 26, FIGS. 3 and 5, has disclosed this technical field as background art. This document discloses as an objective that "a desirable signal is obtained with high accuracy from an optical disc having a plurality of recording layers." As solving means to achieve the above-mentioned objective, the document discloses that "the optical beam of a P-polarized light emitted from an optical source unit (51) is reflected by an optical disc (15) to be turned into an S-polarized light and incident on a lens (61). At ¼ wavelength plates (62, 63), an optical phase difference of +¼ wavelength is added to the optical beam incident on +X side of an optical axis, and the optical phase difference of −¼ wavelength is given to the optical beam incident on −X side, respectively. In this way, signal light passed through the ¼ wavelength plate (63) is turned into the S-polarized light, stray light is turned into the P-polarized light, and a polarization optical device (64) transmits the signal light alone." Further, the Technical Report of IEICE CPM2005-149 (2005-10), page 33, FIGS. 4 and 5, has disclosed as a problem that "a reflected light from one layer different from a targeted layer and a stray light from the other layer are incident on a photodetector to occur an offset in a TE signal when recording/reproducing a dual layer disc. Accordingly, in the case of the existing configuration without having a stray light provision against other layers, the offset of the TE signal on the dual layer disc becomes large compared with the case of a single layer disc, so that a stable control cannot be obtained." As solving means to eliminate the above-mentioned problem, this document discloses that "a tracking photodetector is arranged on a domain on which the stray light does not occur by the other layer." The configuration of the above description has also been disclosed in JP-A-2004-281026, page 71, FIGS. 22, 24 and 25.

SUMMARY OF THE INVENTION

An optical pickup device displaces an objective lens to adjust it in a focusing direction by detecting a focusing error signal, and also detects a tracking error signal to displace the objective lens in a radius direction of an optical disc and perform a tracking adjustment, for a purpose of correctly irradiating a spot on a predetermined recording track in the optical disc. A positional control for the objective lens is therefore performed by the above-mentioned signals. Among the above-mentioned servo signals, the tracking error signal has a serious problem because the dual layer disc has two recording layers. In the case of dual layer disc, stray light reflected from an untargeted recording layer is incident on a light receiving part on which the signal light reflected from the targeted recording layer is also incident. When both the signal light and stray light are incident on the light receiving parts, the two lights are interfered with each other and a fluctuation component caused by the interference is detected as a tracking error signal.

As for the above-mentioned problem, JP-A-2006-344344 adopts a configuration such that the optical beam reflected from the optical disc is converged by a collecting lens, and extended light caused by transmitting through the two ¼ wavelength plates and the polarization optical device is converged by an another collecting lens to be irradiated on an optical detector. Accordingly, there is a problem that a detection optical system becomes complicated to thereby make the optical pickup device large.

Technical Report of IEICE CPM2005-149 (2005-10) (or JP-A-2004-281026) adopts a configuration such that a tracking light detector is arranged on an outside of stray light coming from the other layer in relation to a focusing optical beam generated around a focusing light detector, and light diffracted at the central portion of a hologram device is thrown to the outside of the stray light coming from the other layer. In this way, this document discloses that a stable tracking control can be performed even in the dual layer disc. However, there is a serious problem to adapt for a multi layer disc having a plurality of layers. That is, in the case of the configuration described in the Technical Report of IEICE CPM2005-149 (2005-10) (or JP-A-2004-281026), the diffraction angle of a diffraction grating must be made large for a purpose of separating the signal light and the light from the multiple layer. The larger the diffraction angle, the larger the size of the optical detector becomes. With this result, a problem arises such that the size of optical pickup device becomes large and its cost increases. A further problem arises such that a lowered diffraction efficiency caused by manufacturing and deformation of the spot occur. Particularly, the lowering of diffraction efficiency is a serious problem from the aspect of S/N ratio of the multi layer disc.

In light of the above-mentioned problems, an objective of the invention is to provide an optical pickup device and optical disc apparatus capable of detecting a stable reproduced signal and a servo signal even from an optical disc having recording parts of dual or multi layer, and also capable of making it small.

The above objective can be achieved, for example, by the invention described in the claims.

According to the invention, the optical pickup device and the optical disc apparatus mounted with the optical pickup device, capable of obtaining the stable reproduced signal and servo signal and of making it small, can be provided when recording and reproducing for an information recording medium having a plurality of information recording surfaces.

The other objectives, features and advantages of the invention will become apparent from the following description of the embodiments of the invention taken in conjunction with the accompanying drawings.

DETAILED DESCRIPTION OF THE EMBODIMENTS

Embodiment 1

Figure 1:
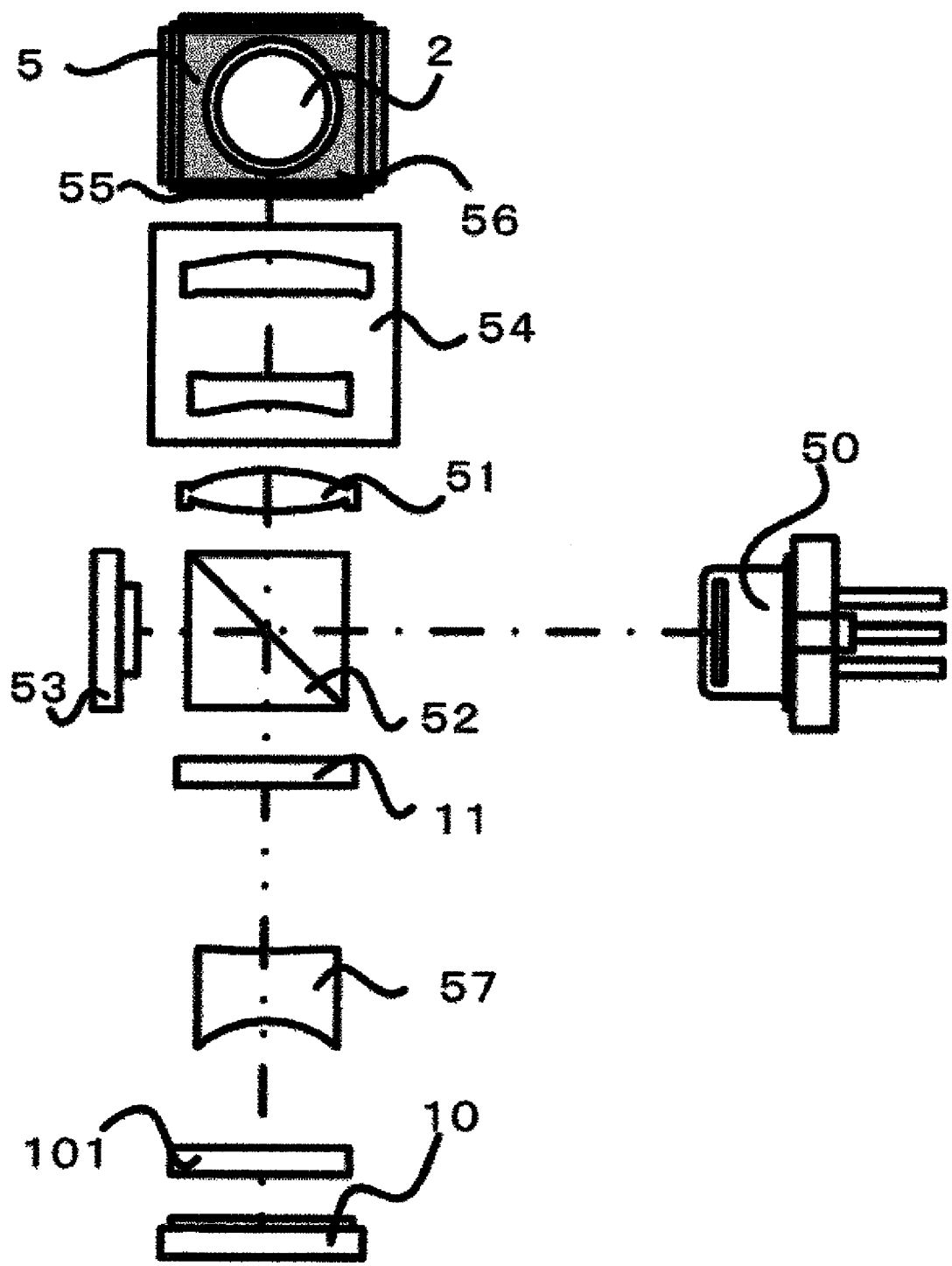
FIG. 1 is an explanatory diagram illustrating an optical system in a first embodiment of the invention.

FIG. 1 illustrates an optical system according to a first embodiment of the invention. A semiconductor laser 50 emits an optical beam of approximately 405 nm wavelength as diverging light. The optical beam emitted from the semiconductor laser 50 is reflected at a beam splitter 52. In addition, a part of the optical beam transmits through the beam splitter 52 to be incident on a front monitor 53. Generally, when information is recorded to a recording type optical disc, a predetermined light quantity is irradiated on a recording surface of the optical disc. Therefore, it is required to control the light quantity of semiconductor laser 50 in high accuracy. To this end, the front monitor 53 detects a variation of the light quantity from the semiconductor laser 50 when recording a signal to the recording type optical disc, and feeds back the variation to a drive circuit (not shown) of the semiconductor laser 50. In consequence, it is possible to monitor the light quantity on the optical disc.

The optical beam reflected by the beam splitter 52 is transformed into a substantially parallel optical beam by a collimating lens 51. The optical beam transmitted through the collimating lens 51 is incident on a beam expander 54. The beam expander 54 is used for compensating spherical aberration caused by a thickness variation of a cover layer on the optical disc 100, by varying the diverging/converging condition of the optical beam. The optical beam emitted from the beam expander 54 is reflected at a setting-up mirror 55 to transmit through a ¼ wavelength plate 56 and converge on the optical disc 100 by an objective lens 2 mounted on an actuator 5.

Figure 2:
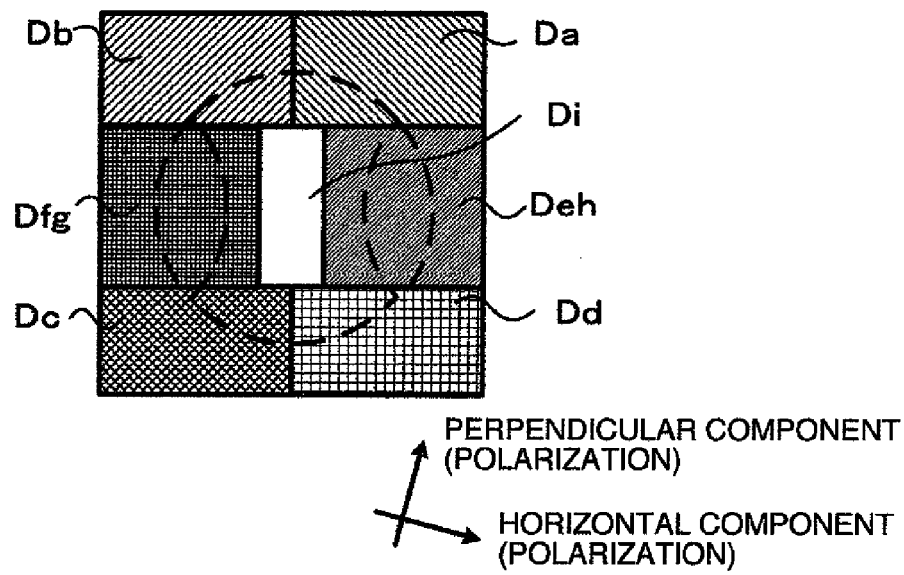
FIG. 2 is a diagram illustrating a diffraction grating in the first embodiment.

The optical beam reflected from the optical disc 100 transmits through the objective lens 2, ¼ wavelength plate 56, setting-up mirror 55, beam expander 54, collimating lens 51 and beam splitter 52 to then be incident on a polarization diffraction grating 11. FIG. 2 illustrates the polarization diffraction grating 11. The polarization diffraction grating 11 has a different diffraction grating pitch and a groove direction for every domain, and optical beams emitted from respective domains are diffracted in different directions. The optical beam diffracted at the polarization diffraction grating 11 then transmits through a detecting lens 57 and a polarization filter 101 (or an analyzer) to be incident on an optical detector 10. At this time, a predetermined astigmatism is given by the detecting lens 57, so that a focusing error signal can be detected by an astigmatism method.

Here, a tracking error signal will be described first. A differential push-pull method has been known as a general method for detecting the tracking error signal. This differential push-pull (DPP) method divides the optical beam into a main beam, a sub-beam +1 order and a sub-beam −1 order by a diffraction grating, and computation is applied to a main push-pull (MPP) signal obtained from the main beam in a radius direction and a sub push-pull (SPP) signal obtained from the sub-beam +1 order and the sub-beam −1 order by using the following equation (1) to thereby reduce a DC offset.

$$DPP = MPP - k \times SPP \qquad (1)$$

where k is a coefficient for correcting the light quantity ratio of the main beam and sub-beam. However, a problem arises when reproducing the dual or multi layer disc in the DPP method. This problem will be described with use of a most simplified dual layer disc.

The dual layer optical disc has two recording surfaces from which an optical beam is reflected respectively. Accordingly, the optical beam is separated into two in response to the dual layer optical disc to then transmit through two light paths and to be incident on the optical detector 10. For example, when a optical beam is focused on one layer, this optical beam forms a spot (signal light) on the surface of the optical detector 10 and an optical beam reflected from the other layer (stray light) is incident on the optical detector 10 in out of focus. At this time, the signal light and stray light reflected respectively from the layers are overlapped on the optical detector 10 to therefore occur an interference. Essentially, emitted optical beams having the same laser frequency do not vary with time. However, the phase relation between the two optical beams is varied with time since the interval between respective layers varies in response to the rotation of the optical disc, thus, causing a variation of the DPP signal as a tracking error signal. This variation of the DPP signal is largely caused mainly by the SPP signal. A large interference between the signal light of the sub-beam and the stray light of the main beam in relation to the signal light is caused, because the light quantity ratio of the main beam (0 order diffracted light), the sub-beam +1 order diffracted light and the sub-beam −1 order diffracted light, is generally set to 10:1:1 to 20:1:1 in which the light quantities of the sub-beams are smaller than that of the main beam. A description for the interference is omitted since it has been known. In consequence, the SPP signal varies largely, and as a result, the DPP signal as the tracking error signal varies largely. When the variation of the tracking error signal occurs, the spots on the optical disc 100 can not follow along a track, so that a problem such as a deterioration of recording/reproducing signal mainly arises.

As for this problem, in the Technical Report of IEICE CPM2005-149 (2005-10) (or JP-A-2004-281026), one spot is formed on an optical disc, and reflected light from the spot is divided into a plurality of domains to be separated into signal light and stray light, and then detect the signal light. In consequence, since the stray optical beam is not incident on a light receiving part by which the tracking error signal is detected, it is possible to detect a stable tracking error signal. However, in the case of using a multi layer disc, the following problem arises.

In the multi layer disc, the interval between a layer nearest to the surface and a layer farthermost thereto becomes inevitably large compared with the interval between the layers of dual layer disc. Accordingly, the intensity of stray light on the light receiving part becomes large compared with that of the stray light on the dual layer disc. Although the interval of light receiving part can be set such that the signal light is detected at the outside of stray light as described in the Technical Report of IEICE CPM2005-149 (2005-10) (or JP-A-2004-281026), according to this configuration, a diffraction angle of the diffraction grating must be made large for the purpose of separating the signal light from the light coming from the multiple layers. The larger the diffraction angle, the larger the size of the optical detector becomes. In consequence, a problem arises such that the size of optical pickup device increases and its cost also increases. A further problem such that the diffraction efficiency is lowered by manufacturing and a spot deformation occurs. In particular, the lowering of diffraction efficiency is a serious problem from the aspect of S/N ratio of the multi layer disc.

In contrast, in this embodiment, since the diffraction angle can be made small by mounting the polarization diffraction grating 11 and the polarization filter 101, it is possible to adapt to the multi layer disc without lowering the diffraction efficiency. It is also possible to make the optical detector small compared with that described in the Technical Report of IEICE CPM2005-149 (2005-10) (or JP-A-2004-281026).

This embodiment will be described with a single layer disc. FIG. 2 illustrates the polarization diffraction grating 11 in which the light quantity of a +1 order diffracted light, 0 order diffracted light and −1 order diffracted light in relation to the polarization in the perpendicular direction, is set to 1:0:0, and that of the +1 order diffracted light, 0 order diffracted light and −1 order diffracted light in relation to the horizontal direction, is set to 0:1:0, for example. At this time, a manner of setting the axes of the perpendicular and horizontal directions of the polarization diffraction grating 11 is set such that they are slightly inclined with respect to the incident polarization as shown in FIG. 2. Accordingly, it is possible to vary the light quantity ratio of the 0 order diffracted light and +1 order diffracted light despite that the polarization condition of the 0 order diffracted light and the +1 order diffracted light is different depending on the manner of setting the axes of the polarization diffraction grating 11. Here, in the optical beam diffracted through the polarization diffraction grating 11, the light quantity ratio of the 0 order diffracted light and +1 order diffracted light is set to 7:3. Further, the polarization diffraction grating 11 is configured by domains Da, Db, Dc, Dd, Deh, Dfg and Di, as illustrated in FIG. 2, in which the respective domains are different in groove period and groove direction.

Figure 3:
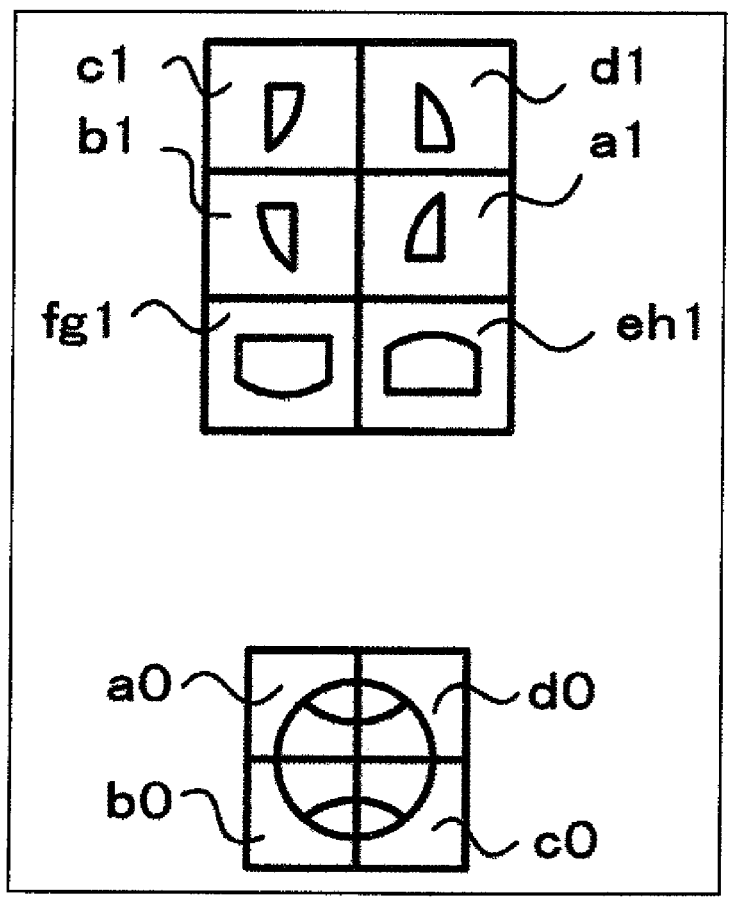
FIG. 3 is a diagram illustrating light receiving parts in the first embodiment.

The signal light diffracted at the polarization diffraction grating 11 transmits through the polarization filter 101 to be incident on the optical detector 10. The optical detector 10 has ten light receiving parts as illustrated in FIG. 3. The 0 order diffracted light diffracted through the diffraction grating domains Da, Db, Dc, Dd, Deh, Dfg and Di is incident on the light receiving parts a0, b0, c0 and d0. Further, the +1 order diffracted light diffracted through the diffraction grating domains Da, Db, Dc, Dd, Deh and Dfg is incident on the light receiving parts a1, b1, c1, d1, eh1 and fg1, respectively. Computation is applied to signals A0, B0, C0, D0, A1, B1, C1, D1, EH1 and FG1 obtained from the light receiving parts a0, b0, c0, d0 and a1, b1, c1, d1, eh1, fg1 by using the following equation (2) to thereby generate a focusing error signal (FES), a tracking error signal (TES) and an RF signal.

$$FES=(A0+C0)-(B0+D0)$$

$$TES=\{(A1+D1)-(B1+C1)\}kt1\times\{(EH1)-(FG1)\}$$

$$RF=A0+B0+C0+D0 \qquad (2)$$

where kt1 is a coefficient which is used for not generating a DC component on the tracking error signal when the objective lens is displaced. According to the above-mentioned computation, good RF signal and servo signal can be detected.

Figure 4:
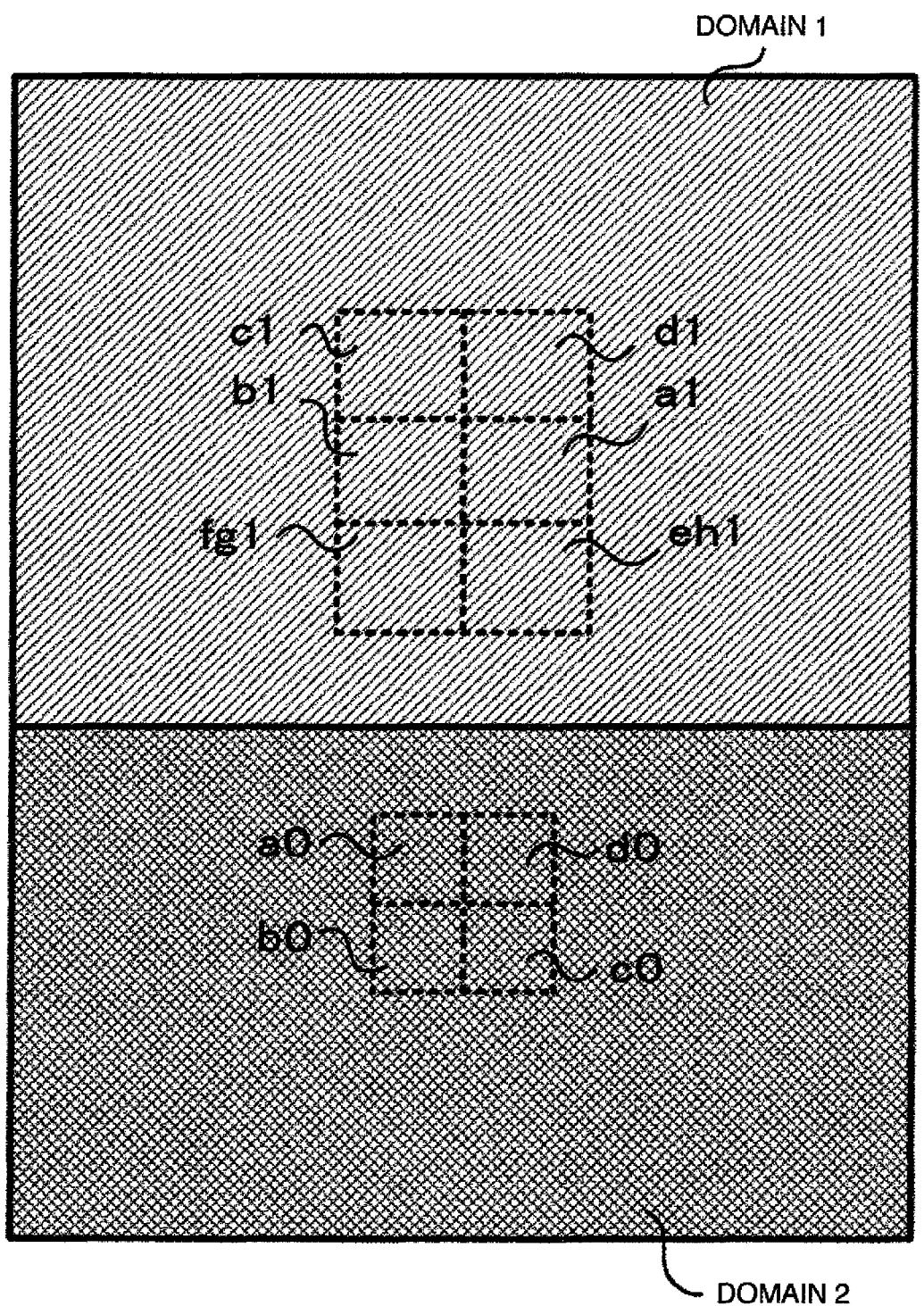
FIG. 4 is a diagram illustrating a polarization filter in the first embodiment.

The following description will be concerned with the multi layer disc. Specifically, the description will be concerned with a case where a focusing control is applied to a layer (Layer2) near to the surface of a triple layer disc (hereinafter, referred to as Layer2, Layer1 and Layer0 in the order from the side near to the disc surface), as an example. Signal light and stray light reflected from the triple layer disc are incident on the polarization diffraction grating 11 via the objective lens 2, ¼ wavelength plate 56, setting-up mirror 55, beam expander 54, collimating lens 51 and beam splitter 52. Signal light and stray light diffracted through the polarization diffraction grating 11 transmits partially through the polarization filter 101 to be incident on the optical detector 10. The polarization filter 101 has a shape as illustrated in FIG. 4, in which a domain 1 has a characteristic which transmits only a polarization component (+1 order diffracted light component) of the perpendicular direction, and a domain 2 has a characteristic which transmits only a component (0 order diffracted light component) of the horizontal direction. Further, the domain 1 has the light receiving parts a1, b1, c1, d1, eh1 and fg1, and the domain 2 has the light receiving parts a0, b0, c0 and d0. This kind of polarization filter 101 can be realized by a photonic crystal.

Figure 5A:
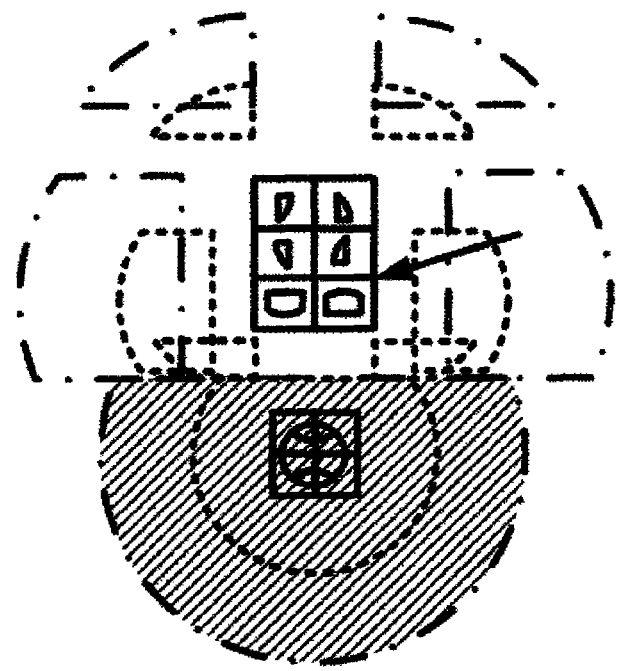
FIGS. 5A and 5B are diagrams each illustrating a shape (on optical detector) of a stray light in a recording/reproducing of a triple layer disc.
Figure 5B:
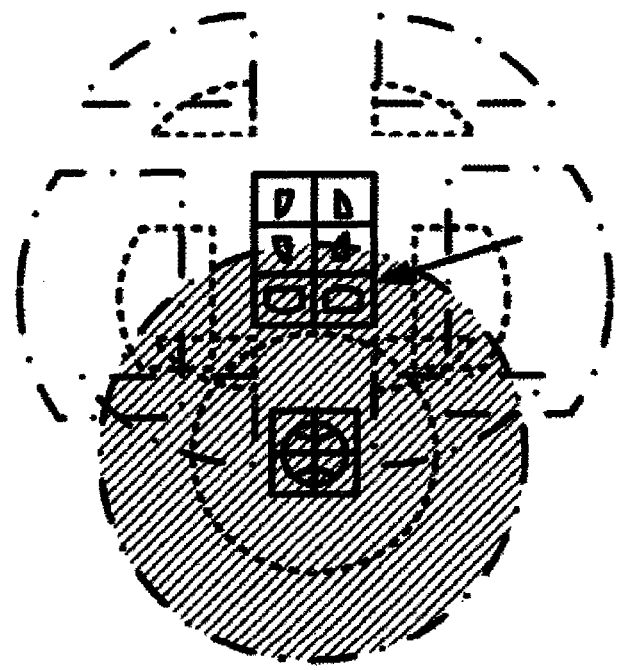

By using or inserting the above-mentioned polarization filter 101, a relationship between the signal light and stray light on the light receiving part is illustrated in FIGS. 5A and 5B. Here, a solid line indicates the signal light reflected from the Layer2, a dashed line indicates the stray light reflected from the Layer1, an alternate long and short dashed line indicates the stray light reflected from the Layer0, and an oblique line indicates a most influential stray light (stray light of the 0 order diffracted light having a large light quantity). Further, FIG. 5A illustrates a case where the polarization filter 101 is mounted, and FIG. 5B illustrates a case where the polarization filter 101 is not mounted. Thus, a stray light component of the 0 order diffracted light is incident on the light receiving parts a1, b1, fg1 and eh1 when the polarization filter 101 is not mounted. Accordingly, a problem arises such that the signal obtained from the light receiving parts fluctuates. In contrast, by inserting the polarization filter 101, it is possible to separate the signal light and stray light on the light receiving part (FIGS. 5A and 5B). Although the stray light is incident on the light receiving parts a0, b0, c0 and d0, this causes no problem practically since the light quantity of signal light is large.

In the configuration described in the Technical Report of IEICE CPM2005-149 (2005-10) (or JP-A-2004-281026), the stray light can not be separated if the interval between the light receiving parts is extended. Further, the diffraction angle of diffraction grating becomes large, as described above, if the interval between the light receiving parts is extended. Therefore, a problem of diffraction efficiency arises. In contrast, by mounting the polarization filter 101 in this embodiment, it is possible to detect only a signal component by a diffraction angle which is smaller than the existing diffraction angle, so that a stable servo signal can be detected. It is also possible to make the optical detector 10 small since a configuration in which the diffraction angle can be made small is adopted.

Figure 6A:
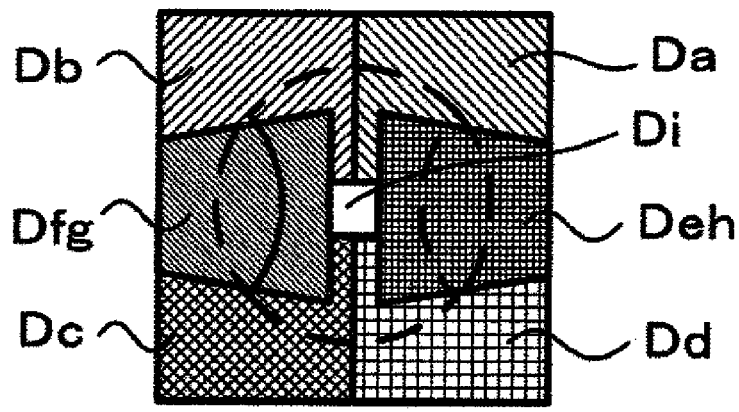
FIGS. 6A to 6C are diagrams illustrating other diffraction gratings in the first embodiment.
Figure 6B:
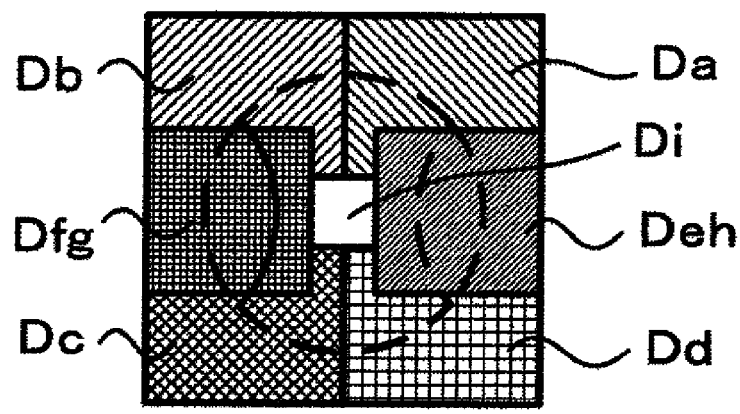
Figure 6C:
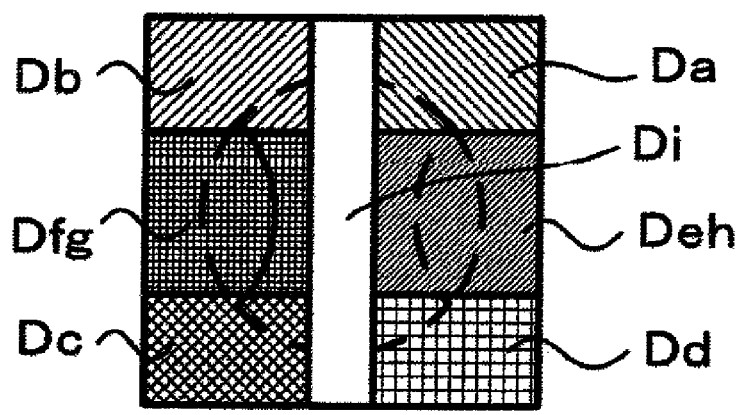
Figure 7:
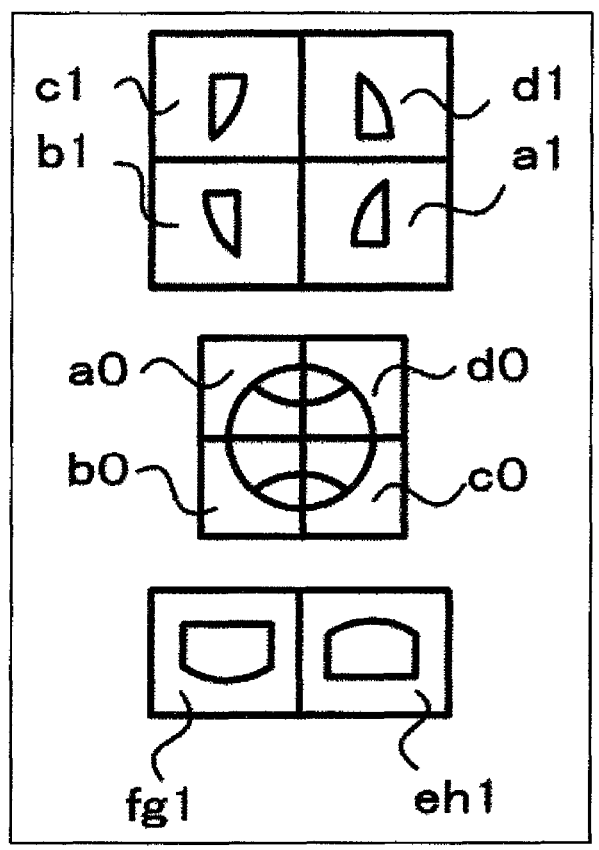
FIG. 7 is a diagram illustrating other light receiving parts in the first embodiment.

In this embodiment, the description has been concerned with the triple layer disc, however, it is needless to say that in the case of the dual layer or multi layer disc the same advantage as described above can also be obtained. It is also needless to say that the polarization characteristic of the polarization diffraction grating 11 is not limited to the above-mentioned case and the same advantage can be obtained by using the polarization diffraction grating even if there is a difference with this embodiment. Further, the polarization filter 101 can have the same advantage even if it is adhered on the light receiving part or separated from it. It is needless to say that the shape of polarization filter 101 is not limited to this embodiment, but as long as the signal light can be separated from the stray light by an arrangement pattern thereof, the same advantage can also be obtained as described above. It is needless to say that the arrangement pattern of polarization diffraction grating 11 is not limited to this embodiment, and the arrangement patterns illustrated in FIGS. 6A to 6C can have the same advantage as described above. Further, the arrangement pattern of optical detector 10 is also not limited to the above-mentioned configuration. For example, the arrangement pattern of the optical detector 10 in FIG. 7 can have the same advantage as described above, by separating the signal light and stray light incident on the light receiving part by a polarization filter. It is needless to say that the same advantage as described above can be obtained in the polarization filter 101, even by configuring the polarization diffraction grating 11 having different polarization characteristics in the domain 1 and domain 2.

Embodiment 2

Figure 8:
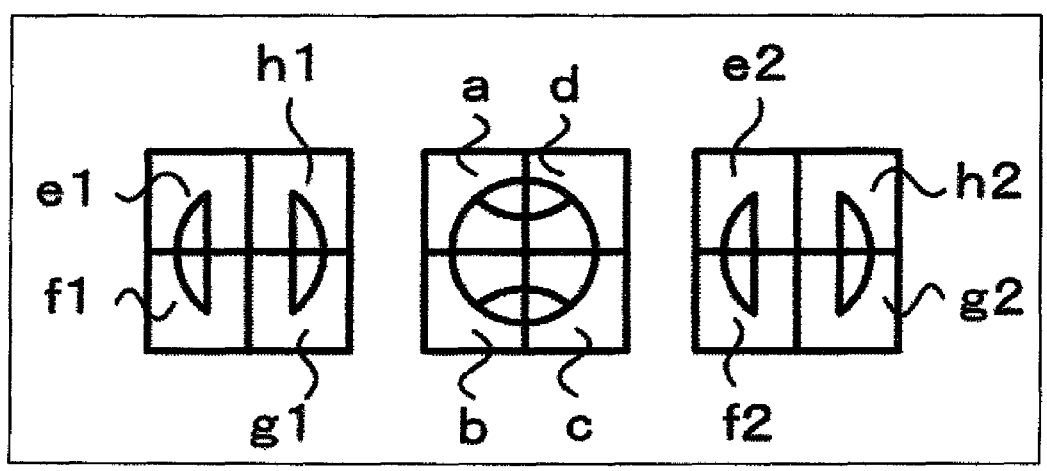
FIG. 8 is a diagram illustrating light receiving parts in a second embodiment.

FIG. 8 is an outline configuration diagram illustrating an example of an optical detector on the optical pickup device according to a second embodiment of the invention. An optical system in this embodiment is the same configuration as shown in FIG. 1, while it has a diffraction grating and an optical detector different from the first embodiment.

First, the second embodiment will be described with use of the single layer disc. The polarization diffraction grating 11 is the same as shown in FIG. 2. For example, the light quantity ratio of the +1 order diffracted light, 0 order diffracted light and −1 order diffracted light in relation to the polarization in the perpendicular direction, is set to 1:0:1 and the light quantity ratio of +1 order diffracted light, 0 order diffracted light and −1 order diffracted light in relation to the polarization in the horizontal direction, is set to 0:1:0. At this time, the manner of setting axes in the perpendicular and horizontal directions of the polarization diffraction grating 11 is set such that they are slightly inclined with respect to an incident polarization as shown in FIG. 2. Accordingly, it is possible to vary the light quantity ratio of the 0 order diffracted light and the +1 order diffracted light (−1 order diffracted light) despite that the polarization condition of the 0 order diffracted light and the +1 order diffracted light (−1 order diffracted light) is different depending on the manner of setting the axes of the polarization diffraction grating. Here, in the optical beam diffracted through the polarization diffraction grating, the light quantity ratio of the +1 order diffracted light, 0 order diffracted light and −1 order diffracted light, is set to 1:10:1. Further, the polarization diffraction grating is configured by domains Da, Db, Dc, Dd, Deh, Dfg and Di, as illustrated in FIG. 2.

The signal light diffracted at the polarization diffraction grating 11 transmits through the polarization filter 101 to be incident on the optical detector 10. The optical detector 10 has twelve light receiving parts as illustrated in FIG. 8. The 0 order diffracted light diffracted through the diffraction grating domains Da, Db, Dc, Dd, Deh, Dfg and Di is incident on the light receiving parts a, b, c and d. Further, the +1 order diffracted light diffracted through the diffraction grating domains Da, Db, Dc and Dd is incident on the light receiving parts e1, f1, g1 and h1, and the −1 order diffracted light is incident on the light receiving parts e2, f2, g2 and h2. Computation is applied to signals A, B, C and D obtained from the light receiving parts a, b, c, d, and signals E1, F1, G1, H1, E2, F2, G2 and H2 obtained from the light receiving parts e1, f1, g1, h1, e2, f2, g2 and h2 by using the following equation (3) to thereby generate the focusing error signal (FES), the tracking error signal (TES) and the RF signal.

$$FES=(A+C)-(B+D)$$

$$TES=\{(A+D)-(B+C)\}-kt2\times[\{E1+E2+H1+H2\}-\{F1+F2+G1+G2\}]$$

$$RF=A+B+C+D \quad (3)$$

where kt2 is a coefficient which is used for not generating the DC component in the tracking error signal when the objective lens is displaced. According to the above-mentioned computation, the good RF signal and servo signal can be detected.

Figure 9:
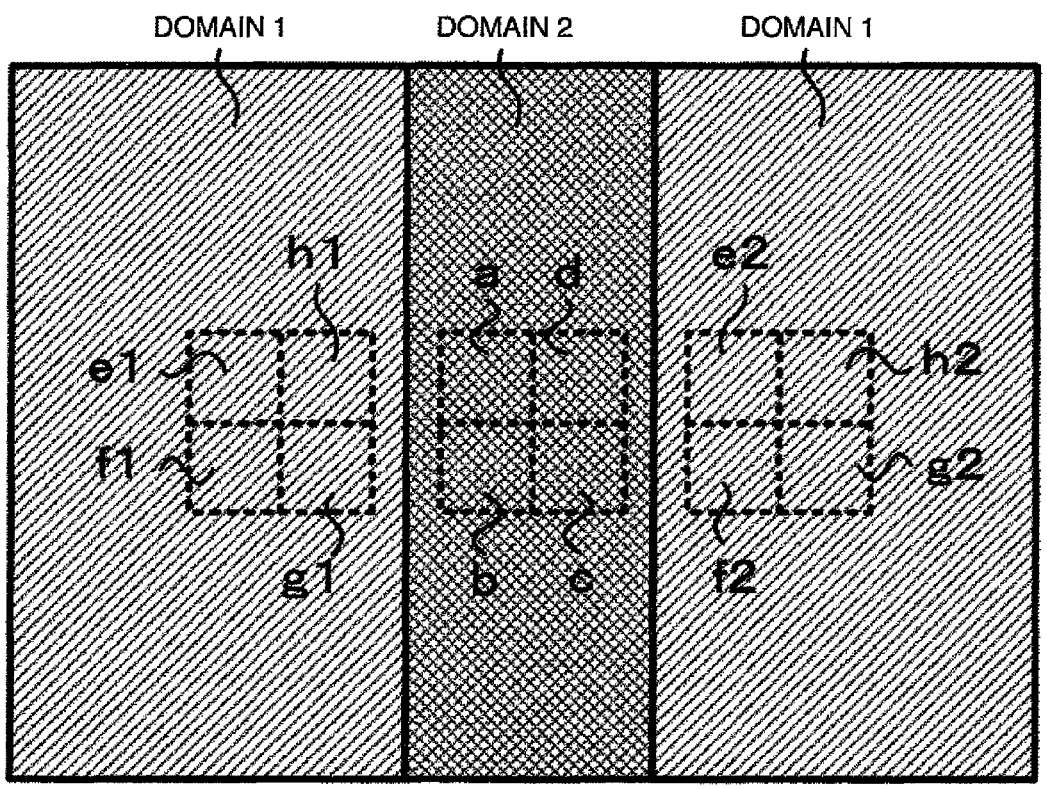
FIG. 9 is a diagram illustrating a polarization filter in the second embodiment.

The following description will be concerned with the multi layer disc. Specifically, the description will be concerned with a case where the focusing control is applied to the layer (Layer2) near to the surface of triple layer disc, as an example. Signal light and stray light reflected from the triple layer disc are incident on the polarization diffraction grating 11 via the objective lens 2, ¼ wavelength plate 56, setting-up mirror 55, beam expander 54, collimating lens 51 and beam splitter 52. Signal light and stray light diffracted through the polarization diffraction grating 11 transmits partially through the polarization filter 101 to be incident on the optical detector 10. FIG. 9 illustrates the polarization filter 101 and its shape in which the domain 1 has a characteristic which transmits only a polarization component (±1 order diffracted light component) in the perpendicular direction, and the domain 2 has a characteristic which transmits only a polarization component (0 order diffracted light component) in the horizontal direction. Further, the domain 1 has the light receiving parts e1, f1, g1, h1, e2, f2, g2 and h2, and the domain 2 has the light receiving parts a, b, c and d.

Figure 10A:
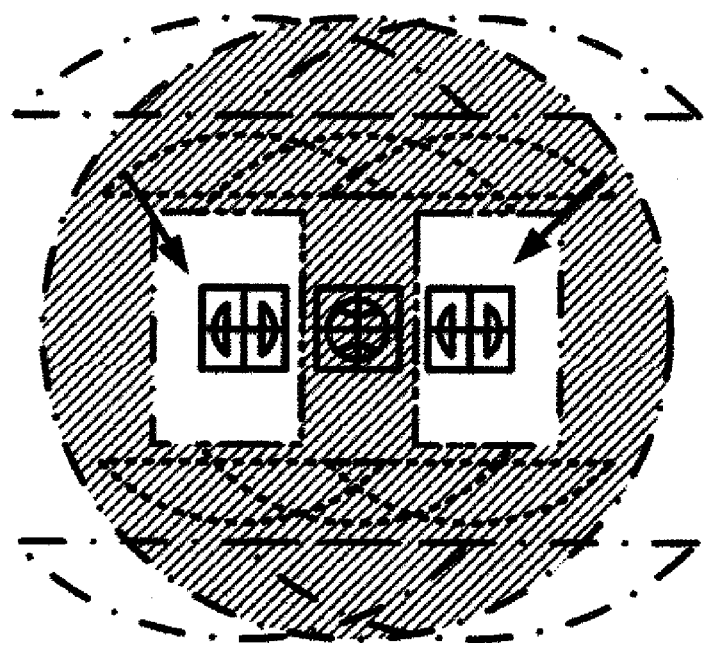
FIGS. 10A and 10B are diagrams each illustrating a shape (on optical detector) of stray light in a recording/reproducing of a triple layer disc.
Figure 10B:
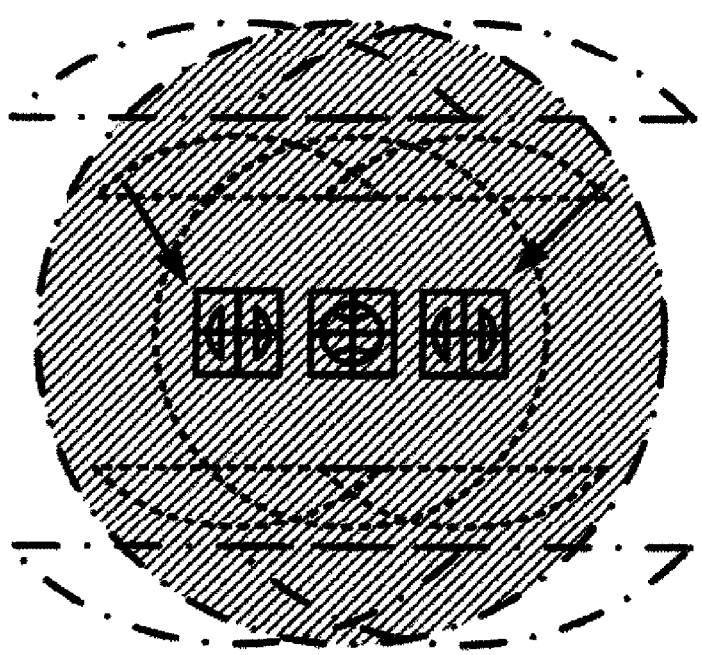

By inserting the above-mentioned polarization filter 101, the relationship between the signal light and stray light on the light receiving part is illustrated in FIGS. 10A and 10B. Here, the solid line indicates the signal light reflected from the Layer2, a dashed line indicates stray light reflected from the Layer1, an alternate long and short dashed line indicates the stray light reflected from the Layer0, and an oblique line indicates most influential stray light (stray light of the 0 order diffracted light having a large light quantity). Further, FIG. 10A illustrates a case where the polarization filter 101 is mounted, and FIG. 10B illustrates a case where the polarization filter 101 is not mounted. As described above, the stray light component of the 0 order diffracted light is incident on the light receiving parts e1, f1, g1, h1, e2, f2, g2 and h2 if the polarization filter 101 is not mounted. In contrast, by inserting the polarization filter 101, it is possible to separate the signal light and stray light on the light receiving part (FIGS. 10A and 10B). Although the stray light is incident on the light receiving parts a, b, c and d, this causes no problem practically since the light quantity of signal light is large. In consequence, it is possible to detect the stable servo signal, and it is also possible to make the optical detector 10 small since the configuration can make the diffraction angle small.

In this embodiment, the description has been concerned with the triple layer disc, however, it is needless to say that the dual layer or multi layer disc can have the same advantage as described above. It is also needless to say that the polarization characteristic of the polarization diffraction grating 11 is not limited to the above-mentioned case and the same advantage as described above can be obtained by using the polarization diffraction grating 11 even if it is different from this embodiment. Further, the polarization filter 101 can have the same advantage even if it is adhered on the light receiving part or separated from that. The shape of polarization filter 101 is not limited to this embodiment, but if the signal light can be separated from the stray light by the arrangement pattern thereof, the same advantage can also be obtained as described above. It is needless to say that the arrangement pattern of polarization diffraction grating 11 is not limited to this embodiment. Further, the arrangement pattern illustrated in FIGS. 6A to 6C can have the same advantage as described above. It is needless to say that the arrangement pattern of optical detector 10 is also not limited to the above-mentioned configuration, and the arrangement pattern of the optical detector 10 can also obtain the same advantage as described above, by separating the signal light and stray light incident on the light receiving parts. It is needless to say that the same advantage as described above can be obtained in the polarization filter 101, even by configuring the polarization diffraction grating 11 having different polarization characteristics in the domain 1 and domain 2.

Embodiment 3

Figure 11:
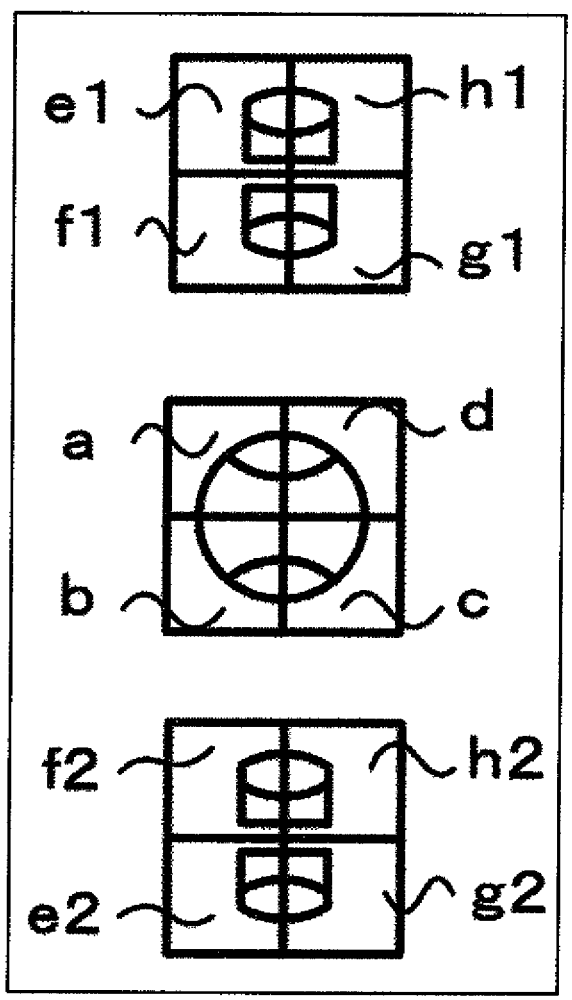
FIG. 11 is a diagram illustrating light receiving parts in a third embodiment.

FIG. 11 is an outline configuration diagram illustrating an example of an optical detector on the optical pickup device according to a third embodiment of the invention. An optical system is the same configuration as shown in FIG. 1, however, which has different diffraction grating and optical detector from the first embodiment.

First, the third embodiment will be described with use of the single layer disc. The diffraction grating 11 is illustrated in FIG. 2. For example, the light quantity ratio of the +1 order diffracted light, 0 order diffracted light and −1 order diffracted light in relation to the polarization in the perpendicular direction, is set to 1:0:1, and the light quantity ratio of +1 order diffracted light, 0 order diffracted light and −1 order diffracted light in relation to the polarization in the horizontal direction, is set to 0:1:0. At this time, the manner of setting axes of the perpendicular and horizontal directions of the polarization diffraction grating 11 is set such that they are slightly inclined with respect to the incident polarization as shown in FIG. 2. Accordingly, it is possible to vary the light quantity ratio of the 0 order diffracted light and the +1 order diffracted light despite that the polarization condition of the 0 order diffracted light and +1 order diffracted light (−1 order diffracted light) is different depending on the manner of setting the axes of the polarization diffraction grating 11. Here, in the optical beam diffracted through the polarization diffraction grating 11, the light quantity ratio of the +1 order diffracted light, 0 order diffracted light and −1 order diffracted light, is set to 1:10:1. Further, the polarization diffraction grating 11 is configured by the domains Da, Db, Dc, Dd, Deh, Dfg and Di, as shown in FIG. 2.

The signal light diffracted through the polarization diffraction grating 11 transmits through the polarization filter 101 to be incident on the optical detector 10. The optical detector 10 has twelve light receiving parts as shown in FIG. 11. The 0 order diffracted light diffracted through the diffraction grating domains Da, Db, Dc, Dd, Deh, Dfg and Di is incident on the light receiving parts a, b, c and d. Further, the +1 order diffracted light diffracted through the diffraction grating domains Deh and Dfg is incident on the light receiving parts e1, f1, g1 and h1, and the −1 order diffracted light is incident on the light receiving parts e2, f2, g2 and h2. Computation is applied to the signals A, B, C and D obtained from the light receiving parts a, b, c and d, and the signals E1, F1, G1, H1, E2, F2, G2 and H2 obtained from the light receiving parts e1, f1, g1, h1, e2, f2, g2 and h2 by using the following equation (4) to thereby generate the focusing error signal (FES), the tracking error signal (TES) and the RF signal.

$$FES=(A+C)-(B+D)$$

$$TES=\{(A+D)-(B+C)\}-kt3\times[\{E1+E2+H1+H2\}-\{F1+F2+G1+G2\}]$$

$$RF=A+B+C+D \quad (4)$$

where kt3 is a coefficient which is used for not generating the DC component in the tracking error signal when the objective lens is displaced. According to the above-mentioned computation, the good RF signal and servo signal can be detected.

Figure 12:
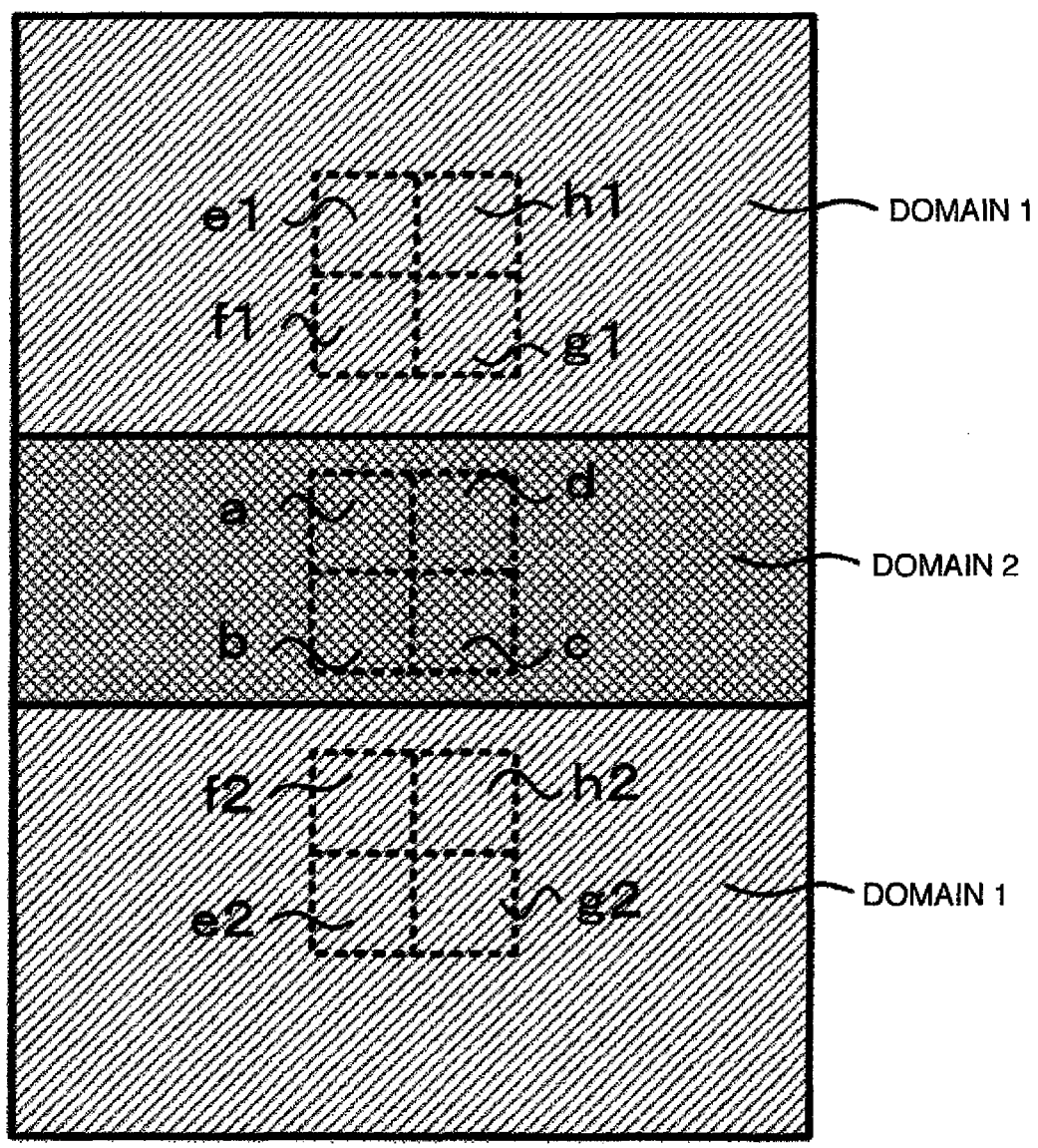
FIG. 12 is a diagram illustrating the polarization filter in the third embodiment.

The following description will be concerned with the multi layer disc. Specifically, the description will be concerned with a case where the focusing control is applied to the layer (Layer2) near to the surface of triple layer disc, as an example. Signal light and stray light reflected from the triple layer disc are incident on the polarization diffraction grating 11 via the objective lens 2, ¼ wavelength plate 56, setting-up mirror 55, beam expander 54, collimating lens 51 and beam splitter 52. Signal light and stray light diffracted through the polarization diffraction grating 11 transmits partially through the polarization filter 101 to be incident on the optical detector 10. FIG. 12 illustrates the polarization filter 101 and its shape in which the domain 1 has a characteristic which transmits only a polarization component (+1 order diffracted light component) in the perpendicular direction, and the domain 2 has a characteristic which transmits only a polarization component (0 order diffracted light component) in the horizontal direction. Further, the domain 1 has the light receiving parts e1, f1, g1, h1, e2, f2, g2 and h2, and the domain 2 has the light receiving parts a, b, c and d.

Figure 13A:
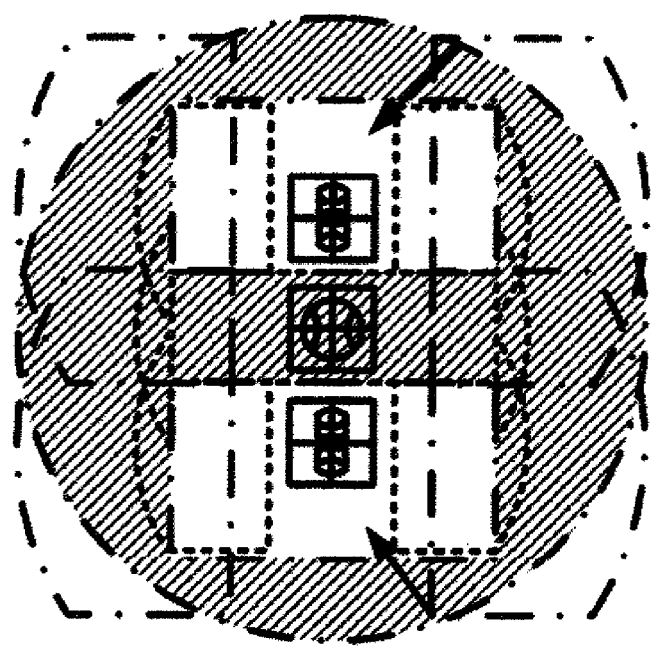
FIGS. 13A and 13B are diagrams each illustrating a shape (on optical detector) of stray light in a recording/reproducing of a triple layer disc.
Figure 13B:
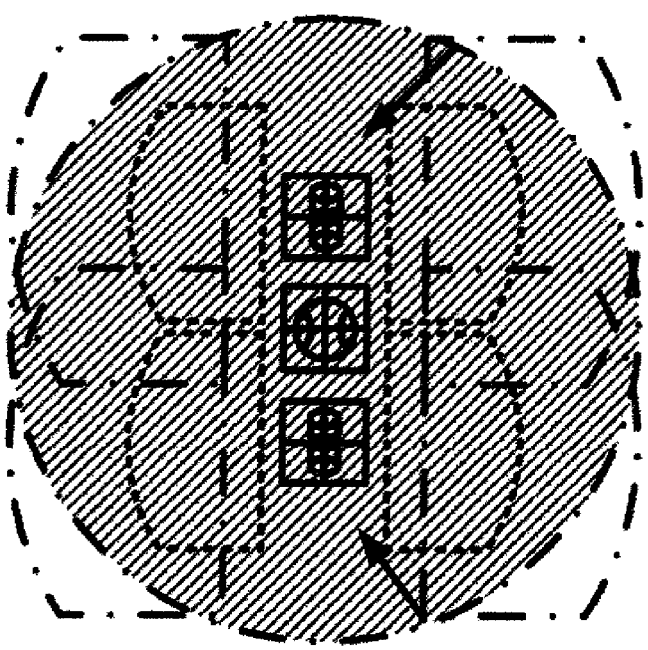

By inserting the above-mentioned polarization filter 101, the relationship between the signal light and stray light on the light receiving part is illustrated in FIG. 13. Here, the solid line indicates signal light reflected from the Layer2, the dashed line indicates stray light reflected from the Layer1, the alternate long and short dashed line indicates the stray light reflected from the Layer0, and the oblique line indicates most influential stray light (stray light of the 0 order diffracted light having a large light quantity). Further, FIG. 13A illustrates a case where the polarization filter 101 is mounted, and FIG. 13B illustrates a case where the polarization filter 101 is not mounted. As described above, the stray light component of the 0 order diffracted light is incident on the light receiving parts e1, f1, g1, h1, e2, f2, g2 and h2 if the polarization filter 101 is not mounted. In contrast, by inserting the polarization filter 101, it is possible to separate the signal light and stray light on the light receiving part (FIGS. 13A and 13B). Although the stray light is incident on the light receiving parts a, b, c and d, this causes no problem practically since the light quantity of signal light is large. In consequence, it is possible to detect the stable servo signal, and it is also possible to make the optical detector 10 small since the configuration can make the diffraction angle small.

In this embodiment, the description has been concerned with the triple layer disc, however, it is needless to say that the dual layer or multi layer disc can have the same advantage as described above. It is also needless to say that the polarization characteristic of the polarization diffraction grating 11 is not limited to the above-mentioned case and the same advantage as described above can be obtained by using the polarization diffraction grating 11 even if it is different from this embodiment. Further, the polarization filter 101 can have the same advantage even if it is adhered on the light receiving part or separated from that. The shape of polarization filter 101 is not limited to this embodiment, but if the signal light can be separated from the stray light by the arrangement pattern thereof, the same advantage can also be obtained as described above. It is needless to say that the arrangement pattern of polarization diffraction grating 11 is not limited to this embodiment. Further, the arrangement pattern illustrated in FIGS. 6A to 6C can have the same advantage as described above. It is needless to say that the arrangement pattern of optical detector 10 is also not limited to the above-mentioned configuration, and the arrangement pattern of the optical detector 10 can also obtain the same advantage as described above, by separating the signal light and stray light incident on the light receiving parts. It is needless to say that the same advantage as described above can be obtained in the polarization filter 101, even by configuring the polarization diffraction grating 11 having different polarization characteristics in the domain 1 and domain 2.

Embodiment 4

Figure 14:
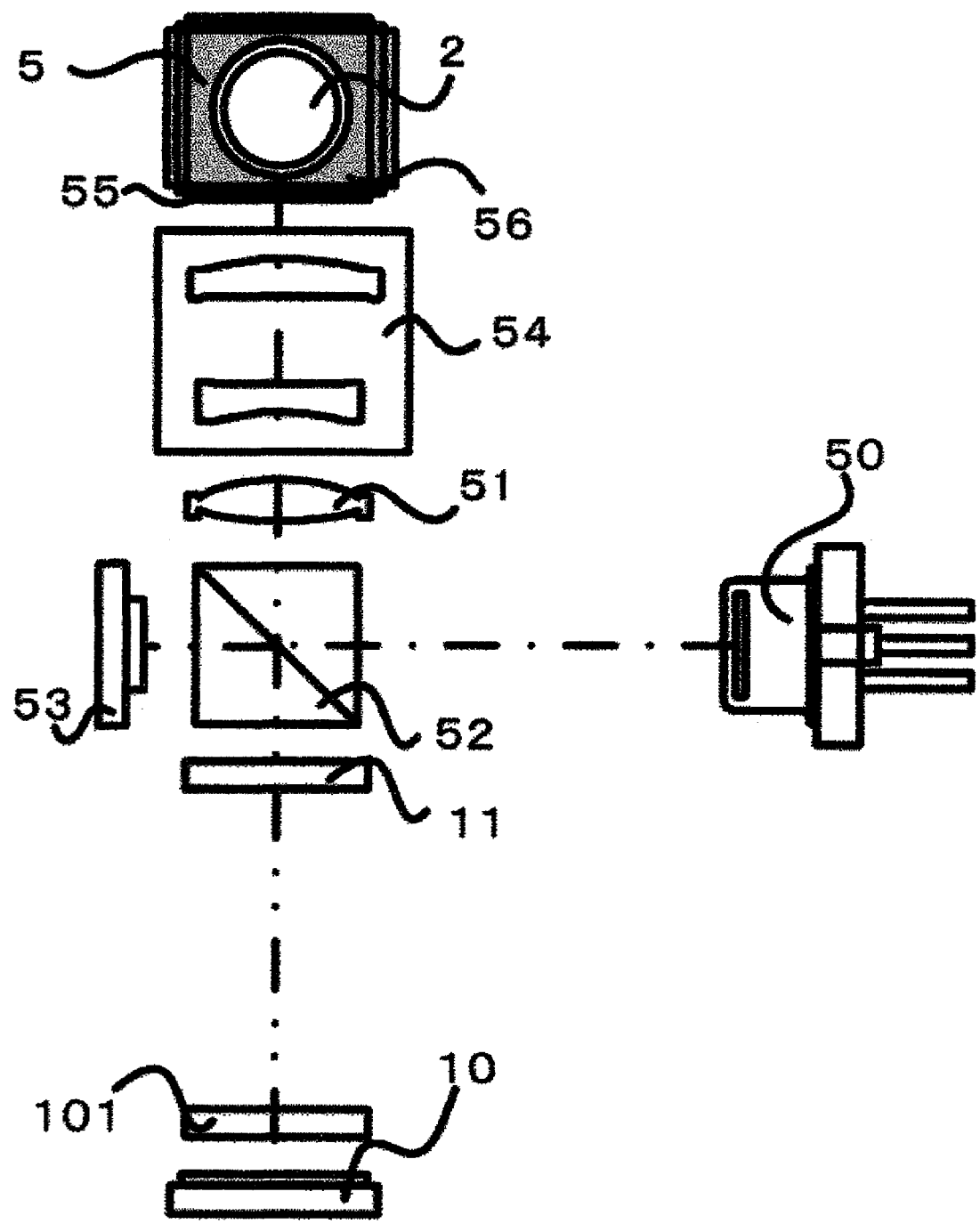
FIG. 14 is a diagram illustrating the optical system in a fourth embodiment.

FIG. 14 illustrates an optical system of an optical pickup device according to a fourth embodiment of the invention.

The semiconductor laser 50 emits an optical beam of 405 nm wavelength as diverging light. The optical beam emitted from the semiconductor laser 50 is reflected at the beam splitter 52. In addition, a part of the optical beam transmits through the beam splitter 52 then to be incident on the front monitor 53. Generally, when information is recorded to the recording type optical disc, a predetermined light quantity is irradiated on the recording surface of optical disc 100. Therefore, it is required to control the light quantity of semiconductor laser 50 in high accuracy. To this end, the front monitor 53 detects a variation of the light quantity from the semiconductor laser 50 when recording a signal to the recording type optical disc 100, and then feeds back the variation to the drive circuit (not shown) of the semiconductor laser 50. In consequence, it is possible to monitor the light quantity on the optical disc 100.

The optical beam reflected at the beam splitter 52 is transformed into a substantially parallel optical beam by the collimating lens 51. The optical beam transmitted through the collimating lens 51 is incident on the beam expander 54. The beam expander 54 is used for compensating spherical aberration caused by the thickness variation of the cover layer on the optical disc 100, by varying the diverging/converging condition of the optical beam. The optical beam emitted from the beam expander 54 is reflected at the setting-up mirror 55 to transmit through the ¼ wavelength plate 56 and then converge on the optical disc 100 by the objective lens 2 mounted on the actuator 5.

Figure 15:
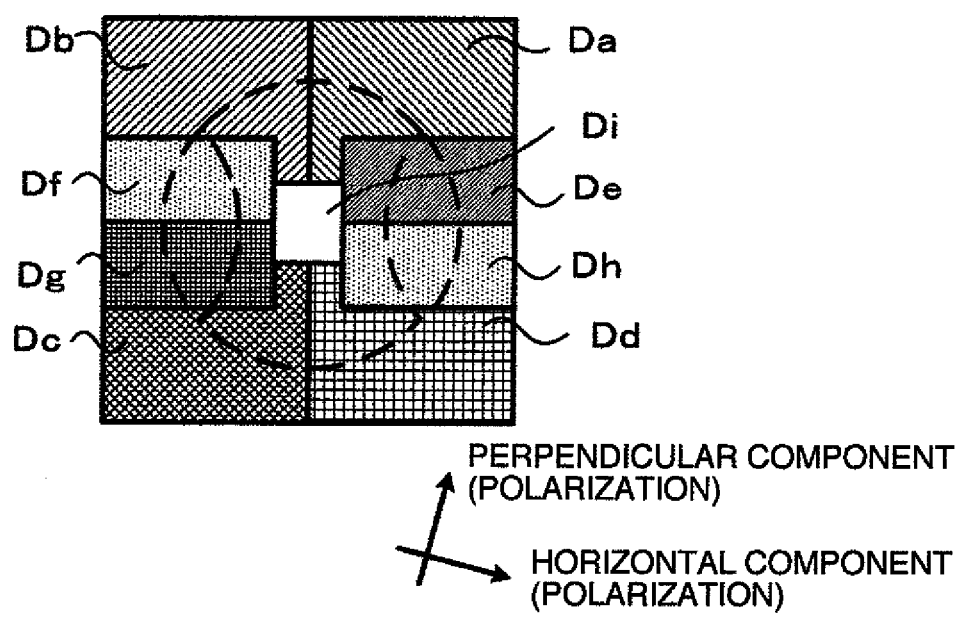
FIG. 15 is a diagram illustrating the diffraction grating in the fourth embodiment.

The optical beam reflected by the optical disc 100 transmits through the objective lens 2, ¼ wavelength plate 56, setting-up mirror 55, beam expander 54, collimating lens 51 and beam splitter 52 to then be incident on the polarization diffraction grating 11. FIG. 15 illustrates the polarization diffraction grating 11. The polarization diffraction grating 11 has a different diffraction grating pitch and a groove direction for every domain, and optical beams emitted from respective domains are diffracted in different directions. The optical beam diffracted at the polarization diffraction grating 11 then transmits through the polarization filter 101 to be incident on the optical detector 10.

This embodiment will be described with the single layer disc. FIG. 15 illustrates the polarization diffraction grating 11 in which the light quantity ratio of the +1 order diffracted light, 0 order diffracted light and −1 order diffracted light in relation to the polarization in the perpendicular direction, is set to 1:0:0, and that of the +1 order diffracted light, 0 order diffracted light and −1 order diffracted light in relation to the polarization in the horizontal direction, is set to 0:1:0, for example. At this time, the manner of setting the axes in the perpendicular and horizontal directions of the polarization diffraction grating 11 is set such that they are slightly inclined with respect to the incident polarization as shown in FIG. 15. Accordingly, it is possible to vary the light quantity ratio of the 0 order diffracted light and +1 order diffracted light despite that the polarization condition of the 0 order diffracted light and +1 order diffracted light is different depending on the manner of setting the axes of the polarization diffraction grating. Here, in the optical beam diffracted at the polarization diffraction grating, the light quantity ratio of the +1 order diffracted light, 0 order diffracted light and the −1 order diffracted light, is set to 1:10:1. Further, the polarization diffraction grating is configured by nine diffraction grating domains Da, Db, Dc, Dd, De, Df, Dg, Dh and Di, in which the respective domains are different in groove period and groove direction.

Figure 16:
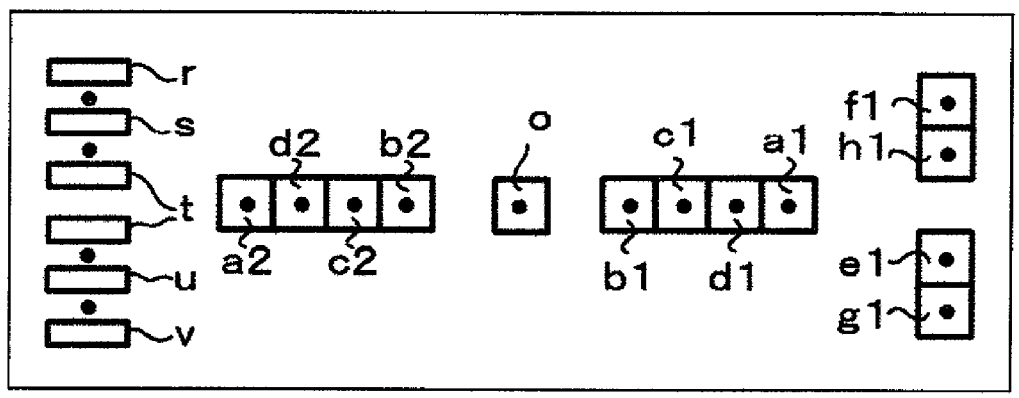
FIG. 16 is a diagram illustrating the light receiving parts in the fourth embodiment.

The signal light diffracted through the polarization diffraction grating 11 transmits through the polarization filter 101 to be incident on the optical detector 10. The optical detector 10 has eighteen light receiving parts as illustrated in FIG. 16. The 0 order diffracted light diffracted through the diffraction grating domains Da, Db, Dc, Dd, De, Df, Dg, Dh and Di is incident on a light receiving part O. Further, the +1 order diffracted light diffracted through the diffraction grating domains Da, Db, Dc, Dd, De, Df, Dg and Dh is incident on the light receiving parts a1, b1, c1, d1, e1, f1, g1 and h1. The −1 order diffracted light is incident on the light receiving parts a2, b2, c2, d2, r, s, t, u and v.

Computation is applied to signals A1, B1, C1, D1, E1, F1, G1, H1, I1, A2, B2, C2, D2, R, S, T, U and V obtained from the light receiving parts a1, b1, c1, d1, e1, f1, g1, h1, i1, r, s, t, u, v, e2, f2, g2 and h2 by using the following equation (5) to thereby generate the focusing error signal (FES), the tracking error signal (TES) and the RF signal.

$$FES=(R+T+V)-(S+U)$$

$$TES=\{(A1+D1+E1+H1)-(B1+C1+F1+G1)\}- kt4\times\{(A2+D2)-(B2+C2)\}$$

$$RF=A1+B1+C1+D1+E1+F1+G1+H1+O \quad (5)$$

where kt4 is a coefficient which is used for not generating the DC component in the tracking error signal when the objective lens is displaced. According to the above-mentioned computation, the good RF signal and servo signal can be detected.

Figure 17:
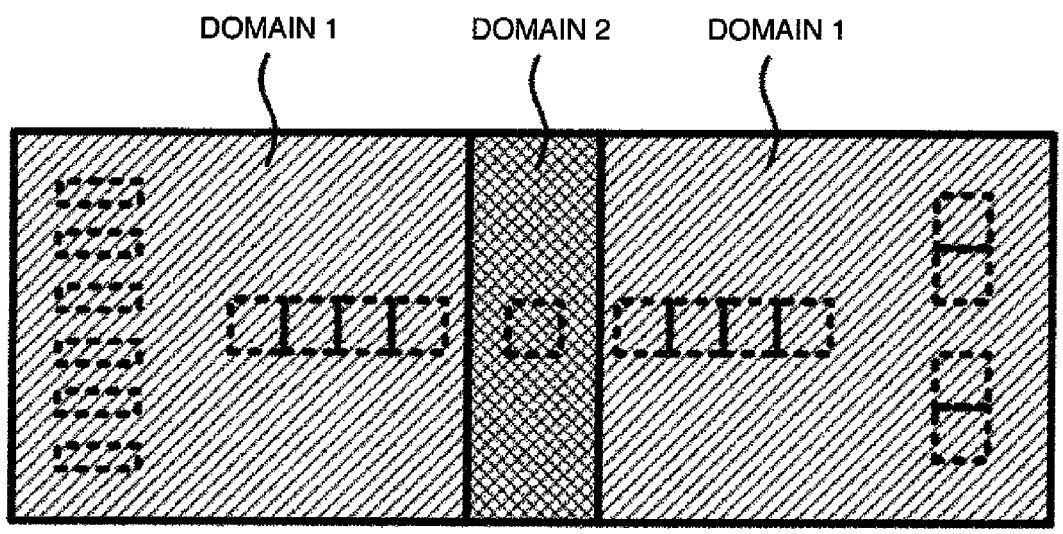
FIG. 17 is a diagram illustrating the polarization filter in the fourth embodiment.

The following description will be concerned with the multi layer disc. Specifically, the description will be concerned with a case where the focusing control is applied to the layer (Layer2) near to the surface of triple layer disc, as an example. Signal light and stray light reflected from the triple layer disc are incident on the polarization diffraction grating 11 via the objective lens 2, ¼ wavelength plate 56, setting-up mirror 55, beam expander 54, collimating lens 51 and beam splitter 52. Signal light and stray light diffracted through the polarization diffraction grating 11 transmit partially through the polarization filter 101 to be incident on the optical detector 10. The polarization filter 101 has a shape as illustrated in FIG. 17, in which a domain 1 has a characteristic which transmits only a polarization component (+1 order diffracted light component) of the perpendicular direction, and a domain 2 has a characteristic which transmits only a component (0 order diffracted light component) of the horizontal direction. Further, the domain 1 has the light receiving parts a1, b1, c1, d1, e1, f1, g1, h1, a2, b2, c2, d2, r, s, t, u and v, and the domain 2 has the light receiving part O.

Figure 18A:
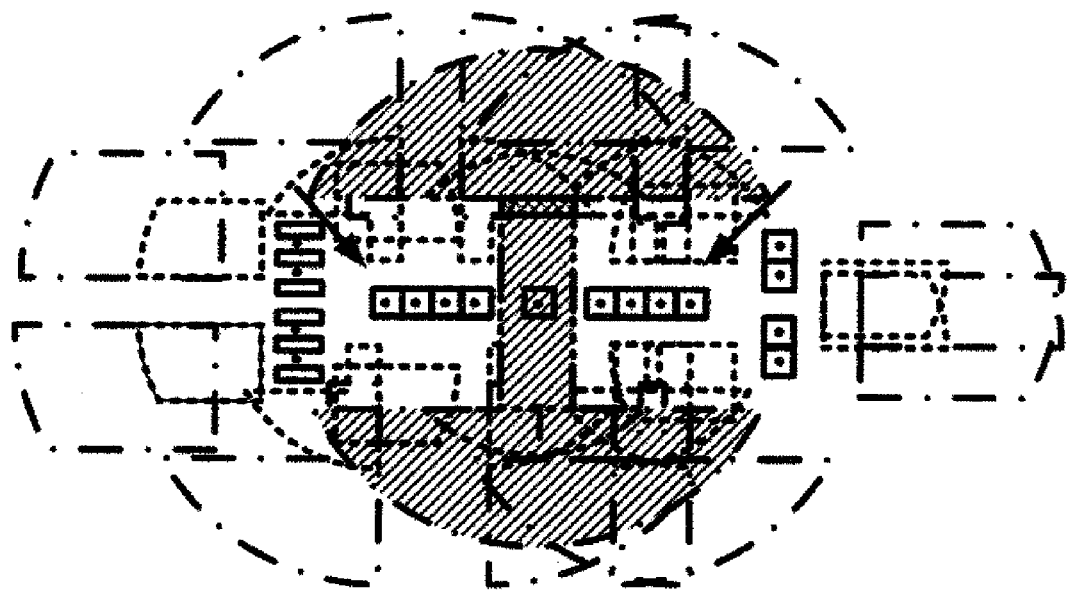
FIGS. 18A and 18B are diagrams each illustrating a shape (on optical detector) of stray light in a recording/reproducing of a triple layer disc.
Figure 18B:
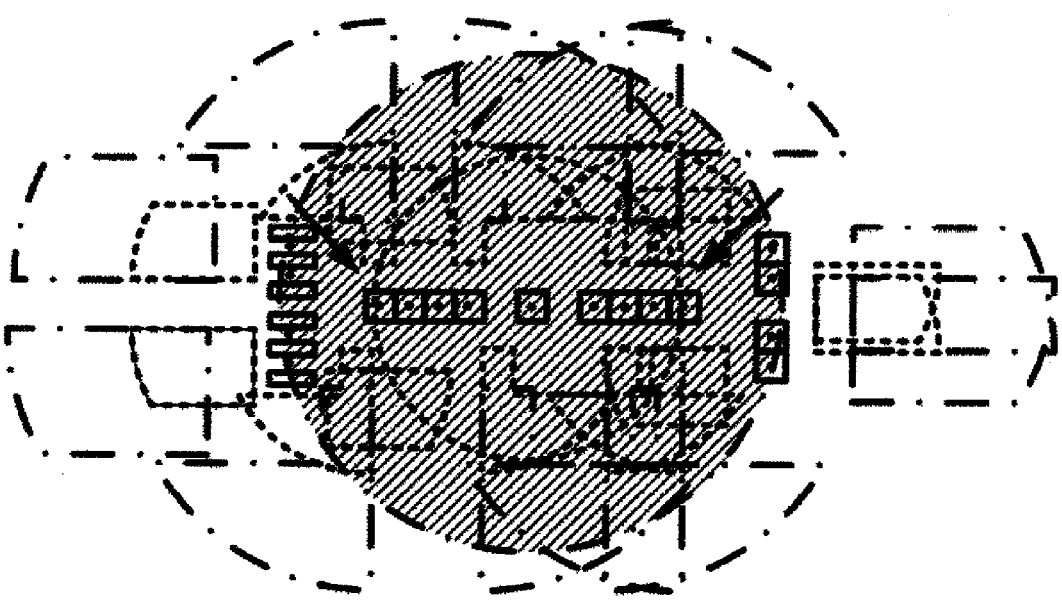

By inserting the above-mentioned polarization filter 101, the relationship between the signal light and stray light on the light receiving part is illustrated in FIGS. 18A and 18B. Here, the solid line indicates signal light reflected from the Layer2, the dashed line indicates stray light reflected from the Layer1, the alternate long and short dash line indicates stray light reflected from the Layer0, and the oblique line indicates most influential stray light (stray light of the 0 order diffracted light having a large light quantity). Further, FIG. 18A illustrates a case where the polarization filter 101 is mounted, and FIG. 18B illustrates a case where the polarization filter 101 is not mounted. As described above, the stray light component of the 0 order diffracted light is incident on the light receiving parts a1, b1, e1, d1, e1, f1, g1, h1, a2, b2, c2, d2, r, s, t, u and v if the polarization filter 101 is not mounted. In contrast, by inserting the polarization filter 101, it is possible to separate the signal light and stray light on the light receiving part (FIGS. 18A and 18B). In consequence, it is possible to detect the stable servo signal, and it is also possible to make the optical detector small since the configuration can make the diffraction angle small.

Figure 19A:
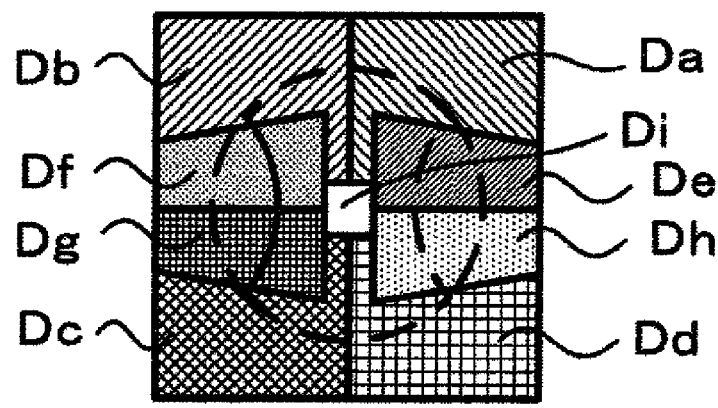
FIGS. 19A to 19C are diagrams each illustrating other diffraction grating in the fourth embodiment.
Figure 19B:
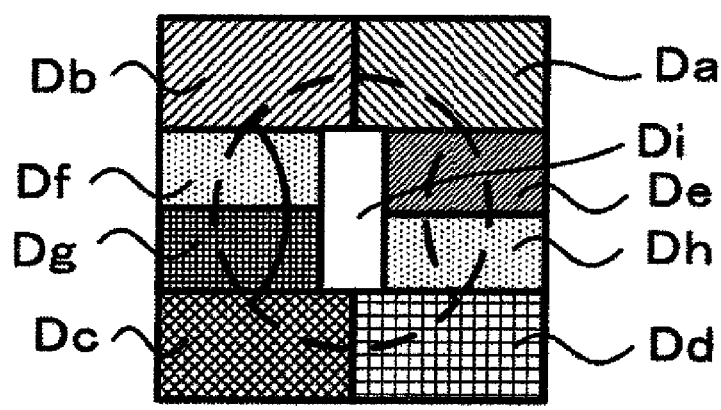
Figure 19C:
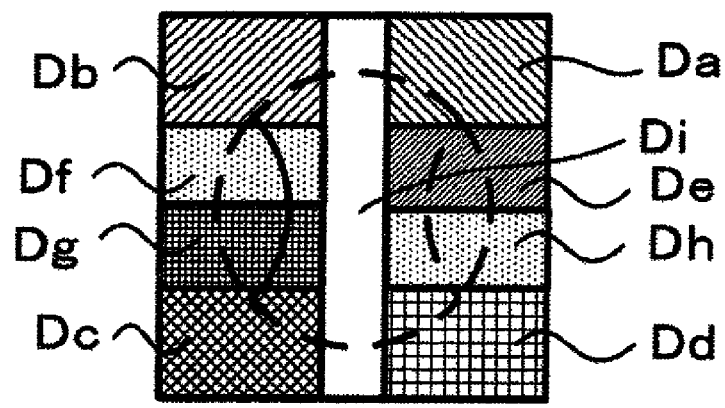

In this embodiment, the description has been concerned with the triple layer disc, however, it is needless to say that the dual layer or multi layer disc can have the same advantage as described above. It is also needless to say that the polarization characteristic of the polarization diffraction grating 11 is not limited to the above-mentioned case and the same advantage as described above can be obtained by using the polarization diffraction grating 11 even if it is different from this embodiment. Further, the polarization filter 101 can have the same advantage even if it is adhered on the light receiving part or separated from that. The shape of polarization filter 101 is not limited to this embodiment, but if the signal light can be separated from the stray light by the arrangement pattern thereof, the same advantage can also be obtained as described above. It is needless to say that the arrangement pattern of polarization diffraction grating 11 is not limited to this embodiment. Further, the arrangement pattern illustrated in FIGS. 19A to 19C can have the same advantage as described above. It is needless to say that the arrangement pattern of optical detector 10 is also not limited to the above-mentioned configuration, and the arrangement pattern of the optical detector 10 can also obtain the same advantage as described above, by separating the signal light and stray light incident on the light receiving parts. It is needless to say that the same advantage as described above can be obtained in the polarization filter 101, even by configuring the polarization diffraction grating 11 having different polarization characteristics in the domain 1 and domain 2.

Embodiment 5

Figure 20:
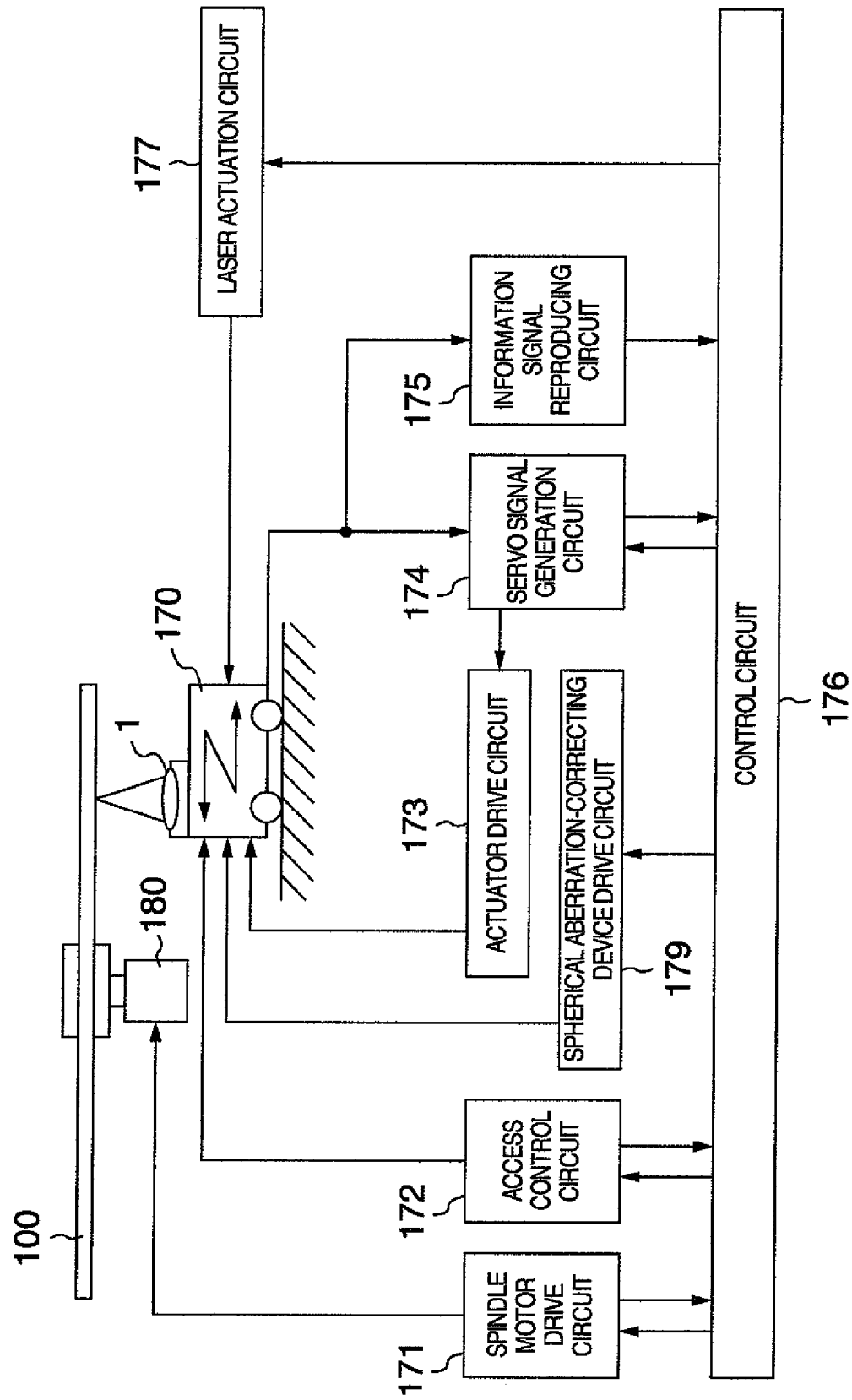
FIG. 20 is an explanatory diagram illustrating an optical reproducing device in a fifth embodiment.

In a fifth embodiment, a description will be concerned with an optical information reproducing device mounting with the optical pickup device. FIG. 20 is an outline configuration diagram of the optical information reproducing device. An optical pickup device 1 is provided on a mechanism 170 capable of driving along the radius direction of optical disc 100 to control its position in response to an access control signal output from an access control circuit 172. A predetermined laser drive current is supplied from a laser actuation circuit 177 to the semiconductor laser 50 in the optical pickup device 1, and the semiconductor laser 50 emits a laser light having a predetermined light quantity in response to a reproduction. In addition, the laser actuation circuit 177 may be incorporated in the optical pickup device 1.

A signal output from the optical detector 10 in the optical pickup device 1 is transmitted to a servo signal generation circuit 174 and an information signal reproducing circuit 175. The servo signal generation circuit 174 generates a servo signal including the focusing error signal, the tracking error signal, a tilt control signal, etc. in accordance with the signal from optical detector 10. On the basis of the servo signal, an actuator in the optical pickup device 1 is driven through an actuator drive circuit 173 to thereby control the position of objective lens 2.

The information signal reproducing circuit 175 reproduces an information signal being recorded on the optical disc 100 on the basis of the signal output from the optical detector 10.

A part of the signal obtained from the servo signal generation circuit 174 and information signal reproducing circuit 175 is transmitted to a control circuit 176. This control circuit 176 is connected with a spindle motor drive circuit 171, an access control circuit 172, the servo signal generation circuit 174, the laser actuation circuit 177, a spherical aberration-correcting device drive circuit 179, etc. to thereby perform a rotation control of a spindle motor 180 for rotating the optical disc 100, a control for an access direction and an access position, a servo control for the objective lens 2, a control for the light quantity of an emitted light from the semiconductor laser 50 in the optical pickup device 1, a correction for the spherical aberration caused by thickness variation of the disc substrate, and so forth.

Embodiment 6

Figure 21:
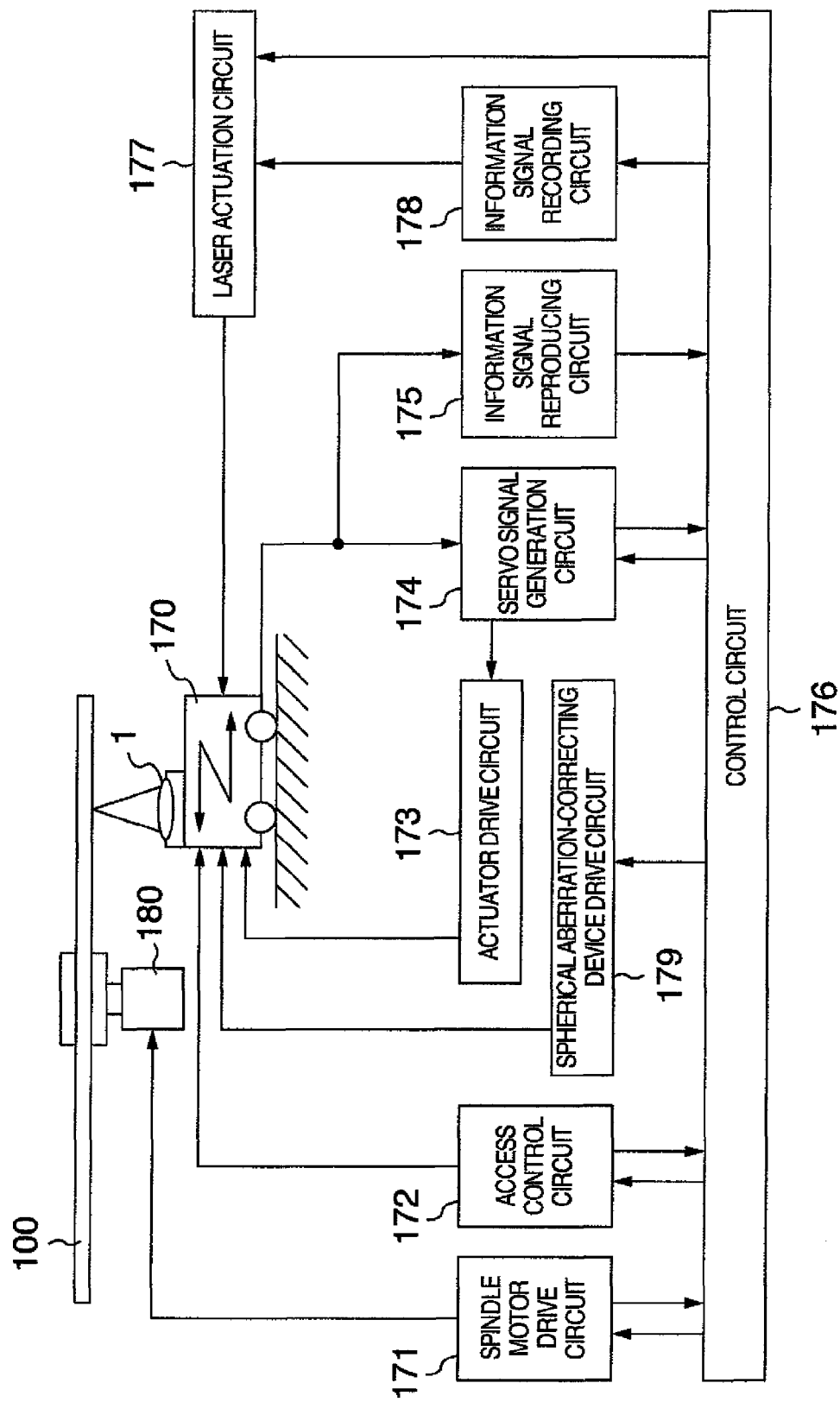
FIG. 21 is an explanatory diagram illustrating an optical recording and reproducing device in a sixth embodiment.

In a sixth embodiment, a description will be concerned with an optical information recording and reproducing apparatus mounted with the optical pickup device 1. FIG. 21 is an output configuration diagram of the optical information recording and reproducing apparatus. The optical information recording and reproducing apparatus is different from the optical information reproducing device in FIG. 20 in that an information signal recording circuit 178 is provided between the control circuit 176 and the laser actuation circuit 177. In consequence, an actuation control for the laser actuation circuit 177 is performed on the basis of a recording control signal output from the information signal recording circuit 178 to add a desired information writing function to the optical disc 100.

In addition, the invention is not limited to the above-mentioned embodiments, but includes various examples. For example, the above-mentioned embodiments are the detailed descriptions for explaining the invention which is easily understood by person having ordinary skill in the art, and not necessarily limited to all of the configurations which have been described. Further, one part of the configurations in one embodiment can be replaced or added to the other part thereof in the other embodiment, and one part of the configurations in the respective embodiments can be added to, deleted from and replaced with the other configurations.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup device comprising:
a semiconductor laser that emits a optical beam;
an objective lens that irradiates the optical beam emitted from the semiconductor laser to an optical disc;
a polarization diffraction grating that diffracts a first optical beam and a second optical beam from the optical beam reflected by the optical disc, a polarization state of the first optical beam being different from that of the second optical beam;
an optical detector having a plurality of light receiving parts for receiving the optical beam diverged by the polarization diffraction grating;
a diverging element which diverges a light path from the semiconductor laser to the optical disc and a light path from the optical disc to the optical detector; and
a polarization device which transmits an optical beam having a predetermined polarization component;
wherein the polarization diffraction grating and the polarization device are mounted between the diverging element and the optical detector;
wherein the first optical beam and the second optical beam diffracted by the polarization diffraction grating enter the optical detector through the polarization device; and
wherein the polarization device includes at least a first domain that transmits the first optical beam and fades the second optical beam and a second domain that transmits the second optical beam and fades the first optical beam.

2. The optical pickup device according to claim 1, wherein the polarization device reflects, absorbs or diffracts the optical beam having a polarization component substantially perpendicular to the predetermined polarization component.

3. The optical pickup device according to claim 1, wherein the polarization device is arranged between the diffraction grating and the optical detector.

4. The optical pickup device according to claim 1, wherein the polarization device includes an analyzer.

5. The optical pickup device according to claim 1, wherein the polarization device includes a polarization filter.

6. The optical pickup device according to claim 1, wherein transmitted light or 0 order diffracted light transmitted through the diffraction grating is substantially perpendicular to a polarization of ±1 order diffracted light diffracted through the diffraction grating.

7. The optical pickup device according to claim 1, wherein the polarization device is disposed in a domain where at least an optical beam having a small light quantity transmits among the light beams diffracted by the diffraction grating.

8. The optical pickup device according to claim 1, wherein 0 order diffracted light diffracted through the diffraction grating, incident on the light receiving part which detects ±1 order diffracted light, +1 order diffracted light or −1 order diffracted light diffracted through the diffraction grating, or transmitted light transmitted through the diffraction grating, is dimmed by the polarization device.

9. The optical pickup device according to claim 1, wherein ±1 order diffracted light, +1 order diffracted light or a −1 order diffracted light, diffracted through the diffraction grating, incident on the light receiving part which detects 0 order diffracted light diffracted through the diffraction grating or a transmitted light transmitted through the diffraction grating, is dimmed by the polarization device.

10. The optical pickup device according to claim 1, wherein the polarization device is made of a photonic crystal.

11. The optical pickup device according to claim 1, wherein the polarization device includes a polarization diffraction grating.

12. The optical pickup device according to claim 1, wherein 0 order diffracted light diffracted through the diffraction grating is used for a reproduced signal.

13. The optical pickup device according to claim 1,
wherein the optical detector includes a first light receiving part for receiving the optical beam transmitted the diffraction grating and a second light receiving part for receiving the optical beam diffracted by the diffraction grating, and
wherein a boundary of the first domain and the second domain is arranged between the first light receiving part and the second light receiving part.

14. The optical pickup device according to claim 1,
wherein the optical detector includes a first light receiving part for receiving the optical beam transmitted the diffraction grating and a second light receiving part for receiving the optical beam diffracted by the diffraction grating, and
wherein the second domain of the polarization device does not include a domain through which the optical beam transmitted the diffraction grating is incident on the second light receiving part on the optical detector.

15. An optical disc apparatus comprising:
an optical pickup device that comprises
a semiconductor laser to emit an optical beam,
an objective lens to irradiate the optical beam emitted from the semiconductor laser,
a polarization diffraction grating to diffract a first optical beam and a second optical beam from the optical beam reflected by an optical disc, a polarization state of the first optical beam being different from that of the second optical beam, an optical detector having a plurality of light receiving parts to receive the optical beam diverged by the polarization diffraction grating,
a diverging element which diverges a light path from the semiconductor laser to the optical disc and a light path from the optical disc to the optical detector, and
a polarization device which transmits an optical beam having a predetermined polarization component;
wherein the polarization diffraction grating and the polarization device are mounted between the diverging element and the optical detector;
wherein the first optical beam and the second optical beam diffracted by the polarization diffraction grating enter the optical detector through the polarization device; and wherein the polarization device includes at least a first domain that transmits the first optical beam and fades the second optical beam and a second domain that transmits the second optical beam and fades the first optical beam;

a laser actuation circuit that drives the semiconductor laser in the optical pickup device;

a servo signal generation circuit that generates a focusing error signal and a tracking error signal by using a signal detected from the optical detector in the optical pickup device; and an information signal reproducing circuit that reproduces information signal recorded in an optical disc.

16. An optical pickup device comprising:

a semiconductor laser that emits an optical beam;

an objective lens that irradiates the optical beam emitted from the semiconductor laser to an optical disc;

a polarization diffraction grating that diffracts a first optical beam and a second optical beam from the optical beam reflected by the optical disc, a polarization state of the first optical beam being different from that of the second optical beam;

an optical detector having a plurality of light receiving parts for receiving the optical beam diverged by the polarization diffraction grating;

a diverging element which diverges a light path from the semiconductor laser to the optical disc and a light path from the optical disc to the optical detector;

a polarization device which transmits an optical beam having a predetermined polarization component;

wherein the polarization diffraction grating and the polarization device are mounted between the diverging element and the optical detector;

wherein the first optical beam and the second optical beam diffracted by the polarization diffraction grating enter the optical detector through the polarization device; and wherein the polarization device includes at least a first domain that fades the first optical beam and transmits the second optical beam and a second domain that fades the second optical beam and transmits the first optical beam.

17. The optical pickup device according claim 16, wherein the optical detector includes a first light receiving part for receiving the optical beam transmitted the diffraction grating and a second light receiving part for receiving the optical beam diffracted by the diffraction grating, and wherein a boundary of the first domain and the second domain is arranged between the first light receiving part and the second light receiving part.

18. The optical pickup device according to claim 16, wherein the optical detector includes a first light receiving part for receiving the optical beam transmitted the diffraction grating and a second light receiving part for receiving the optical beam diffracted by the diffraction grating, and wherein the first domain of the polarization device does not include a domain through which the optical beam diffracted by the diffraction grating is incident on the first light receiving part on the optical detector.

* * * * *